US012604355B2

(12) United States Patent
Li et al.

(10) Patent No.: US 12,604,355 B2
(45) Date of Patent: Apr. 14, 2026

(54) LINK ERROR RECOVERY METHOD AND APPARATUS

(71) Applicant: Nokia Technologies OY, Espoo (FI)

(72) Inventors: Yiqing Li, Shenzhen (CN); Yunbo Li, Shenzhen (CN); Yuchen Guo, Shenzhen (CN); Ming Gan, Shenzhen (CN)

(73) Assignee: Nokia Technologies Oy, Espoo (FI)

( * ) Notice: Subject to any disclaimer, the term of this patent is extended or adjusted under 35 U.S.C. 154(b) by 470 days.

(21) Appl. No.: 18/149,490

(22) Filed: Jan. 3, 2023

(65) Prior Publication Data

US 2023/0145901 A1 May 11, 2023

Related U.S. Application Data

(63) Continuation of application No. PCT/CN2021/104394, filed on Jul. 3, 2021.

(30) Foreign Application Priority Data

Jul. 10, 2020 (CN) .......................... 202010664563.6
Aug. 6, 2020 (CN) .......................... 202010781257.0

(51) Int. Cl.
*H04W 76/15* (2018.01)
*H04B 7/06* (2006.01)
(Continued)

(52) U.S. Cl.
CPC ........... *H04W 76/18* (2018.02); *H04W 76/15* (2018.02)

(58) Field of Classification Search
CPC ..... H04W 76/18; H04W 76/19; H04W 76/15; H04W 84/12; H04L 1/1621; H04L 1/1887; H04L 5/0055; H04L 69/14
(Continued)

(56) References Cited

U.S. PATENT DOCUMENTS 11,489,632 B2 * 11/2022 Kim .......................... H04L 1/00
12,021,950 B2 * 6/2024 Chu ........................ H04L 69/14
(Continued)

FOREIGN PATENT DOCUMENTS

CN 108631954 A 10/2018
CN 108631961 A 10/2018
(Continued)

OTHER PUBLICATIONS

Abhishek Patil (Qualcomm): "Need for Sync PPDU", IEEE Draft; 11-20-0275-02-00BE-NEED-FOR-SYNC-PPDU, IEEE-SA Mentor, Piscataway, NJ USA, vol. 802.11 EHT; 802.11 be, No. 2, Mar. 31, 2020 (Mar. 31, 2020), pp. 1-17, XP068167288.
(Continued)

*Primary Examiner* — Marcus Smith
*Assistant Examiner* — Jason A Harley
(74) *Attorney, Agent, or Firm* — Harness, Dickey & Pierce, P.L.C.

(57) ABSTRACT

A link error recovery method applied to a transmitter MLD is provided. Links between the transmitter MLD and a receiver MLD include a first link and a second link, and one of the transmitter MLD and the receiver MLD has an STR capability while the other does not have the STR capability. The method includes: determining that transmission of a first PPDU on the first link fails; and transmitting a second PPDU to the receiver MLD at a first moment by using the first link, the second PPDU being used to retransmit an error part in the first PPDU. The first moment is a moment at which the transmitter MLD obtains transmission status information of the second link. Alternatively, the first moment is a moment for transmitting a next PPDU on the first link if the first PPDU is normally transmitted.

13 Claims, 22 Drawing Sheets

(51) Int. Cl.

| | |
|---|---|
| *H04L 5/00* | (2006.01) |
| *H04W 56/00* | (2009.01) |
| *H04W 72/04* | (2023.01) |
| *H04W 76/18* | (2018.01) |

(58) Field of Classification Search
USPC ................................................. 370/216, 329
See application file for complete search history.

(56) References Cited

U.S. PATENT DOCUMENTS

| | | | | |
|---|---|---|---|---|
| 2011/0149918 | A1* | 6/2011 | Gong | H04B 7/0617 |
| | | | | 370/336 |
| 2015/0195079 | A1* | 7/2015 | Gong | H04L 5/14 |
| | | | | 370/277 |
| 2016/0164638 | A1* | 6/2016 | Seok | H04L 69/323 |
| | | | | 714/748 |
| 2018/0205502 | A1 | 7/2018 | Merlin et al. | |
| 2019/0223253 | A1* | 7/2019 | Sakamoto | H04L 27/2695 |
| 2019/0261272 | A1* | 8/2019 | Gan | H04W 52/0235 |
| 2020/0037288 | A1 | 1/2020 | Huang et al. | |
| 2023/0164840 | A1* | 5/2023 | Jang | H04L 5/0053 |
| | | | | 370/329 |
| 2023/0319884 | A1* | 10/2023 | Ko | H04W 74/002 |
| | | | | 370/329 |

FOREIGN PATENT DOCUMENTS

| | | |
|---|---|---|
| CN | 110572244 A | 12/2019 |
| IN | 202237002687 A | 6/2022 |
| IN | 202217064386 A | 9/2023 |

OTHER PUBLICATIONS

IEEE 802.11-20/0427r1, Young Hoon Kwon et al., Synchronous multi-link operation, Apr. 6, 2020, 9 pages.
IEEE 802.11-00/336, Michael Fischer et al, The PIFS Ambiguity, Nov. 2000, 6 pages.
Qualcomm: "Need for Sync PPDU," IEEE Draft, 11-20-0275-02-00BE-NEED-FOR-SYNC-PPDU, IEEE-SA MENTOR, 802.11be, Mar. 31, 2020.
Notice of Preliminary Rejection for Korean Application No. 2023-7003027 dated Nov. 17, 2025 and English translation.

* cited by examiner

| L-STF | L-LTF | L-SIG | RL-SIG | HE-SIG-A | HE-STF | HE-LTF | ... | HE-LTF | Data | PE |
|-------|-------|-------|--------|----------|--------|--------|-----|--------|------|-----|

LINK ERROR RECOVERY METHOD AND APPARATUS

CROSS-REFERENCE TO RELATED APPLICATION

This application is a continuation of International Application No. PCT/CN2021/104394, filed on Jul. 3, 2021, which claims priority to Chinese Patent Application No. 202010781257.0, filed on Aug. 6, 2020, which claims priority to Chinese Patent Application No. 202010664563.6, filed on Jul. 10, 2020. The disclosure of the aforementioned applications are hereby incorporated by reference in their entireties.

TECHNICAL FIELD

This application relates to the field of communication technologies, and in particular, to a link error recovery method and apparatus.

BACKGROUND

To achieve a technical goal of extremely high throughput, multi-link (ML) communication is used as one of key technologies in the Institute of Electrical and Electronics Engineers (IEEE) 802.11be standard. A multi-link device (MLD) supporting ML communication has a capability of transmitting and receiving on a plurality of frequency bands, so that the MLD can perform data transmission by using a larger bandwidth, thereby significantly increasing a throughput rate.

Based on whether MLDs have a simultaneous transmitting and receiving (STR) capability on different links, the MLDs may be classified into STR MLDs and non-STR MLDs. One link may refer to a spatial path on which the MLD performs data transmission on one frequency band. The STR MLD has an STR capability, while the non-STR MLD does not have the STR capability.

For a scenario in which the non-STR MLD participates in communication, link error recovery is an important part. Therefore, it is necessary to design a proper solution to implement error recovery in this scenario.

SUMMARY

Embodiments of this application provide a link error recovery method and apparatus, to implement link error recovery in a scenario in which a non-STR MLD participates in communication.

To achieve the foregoing objective, the following technical solutions are used in the embodiments of this application.

According to a first aspect, a link error recovery method is provided, where the method is applied to a transmitter MLD, links between the transmitter MLD and a receiver MLD include a first link and a second link, and one of the transmitter MLD and the receiver MLD has a simultaneous transmitting and receiving STR capability while the other does not have the STR capability. The method includes: The transmitter MLD determines that transmission of a first physical protocol data unit PPDU on the first link fails; and the transmitter MLD transmits a second PPDU to the receiver MLD at a first moment by using the first link, the second PPDU being used to retransmit an error part in the first PPDU.

The first moment is a moment at which the transmitter MLD obtains transmission status information of the second link, and the transmission status information of the second link is used to indicate that transmission of a third PPDU on the second link fails. Alternatively, the first moment is a moment for transmitting a next PPDU on the first link if the first PPDU is normally transmitted.

Based on this solution, on one hand, in a scenario in which one of the transmitter MLD and the receiver MLD has the STR capability while the other does not have the STR capability, and transmission of the first PPDU on the first link fails, the transmitter MLD may transmit the second PPDU at the first moment to retransmit the error part in the first PPDU, thereby implementing error recovery of the first link. On the other hand, when the first moment is the moment at which the transmitter MLD obtains the transmission status information of the second link, a delay in internal transmission status information exchange of the transmitter MLD is considered. As compared with a case in which transmission status information exchange is assumed to be very fast, product implementation is further facilitated, and design pressure on the transmitter MLD is reduced. Alternatively, when the first moment is the moment for transmitting a next PPDU on the first link if the first PPDU is normally transmitted, link recovery can be implemented earlier as compared with a case in which the second PPDU is transmitted at a moment that is at an interval of PIFS from an end moment of a BA of the first PPDU, so that waiting time before the retransmission is reduced. In this case, there may be more time for transmitting new data, thereby increasing link throughput.

In some possible designs, an interval between the moment at which the transmitter MLD obtains the transmission status information of the second link and a predicted start moment of a first acknowledgement block BA is less than or equal to first duration, and the first moment is the moment at which the transmitter MLD obtains the transmission status information of the second link, where the first BA is a BA of the first PPDU, and the first duration is a sum of a length of the first BA and short interframe space SIFS.

In some possible designs, when an interval between the moment at which the transmitter MLD obtains the transmission status information of the second link and a predicted end moment of the first BA is less than or equal to the first duration, and the first duration is the SIFS, the first moment is the moment at which the transmitter MLD obtains the transmission status information of the second link.

Based on the possible designs, because the moment at which the transmitter obtains the transmission status information of the second link or the moment at which the transmitter transmits the second PPDU is earlier than the SIFS after the first BA, and the SIFS is less than the PIFS, link recovery may be implemented earlier as compared with the conventional technology in which a failed PPDU is retransmitted at a moment that is at an interval of PIFS after a first BA ends, so that waiting time before the retransmission is reduced. In this case, there may be more time for transmitting new data, thereby increasing link throughput.

In some possible designs, obtaining, by the transmitter MLD, the transmission status information of the second link includes: receiving, by a first station, the transmission status information of the second link that is from a second station, where the first station is a station that is in the transmitter MLD and supports the first link, and the second station is a station that is in the transmitter MLD and supports the second link.

In some possible designs, before a second moment, the transmitter MLD does not obtain the transmission status information of the second link, and the first moment is a moment for transmitting a next PPDU on the first link if the first PPDU is normally transmitted, where the second moment is later than a predicted end moment of the first BA, an interval between the second moment and the predicted end moment of the first BA is SIFS, and the first BA is a BA of the first PPDU.

Based on the possible designs, because the SIFS is less than the PIFS, if the first PPDU is normally transmitted, the moment for transmitting a next PPDU on the first link is earlier than a moment that is at an interval of PIFS after the first BA ends. Therefore, link recovery may be implemented earlier as compared with the conventional technology in which a failed PPDU is retransmitted at a moment that is at an interval of PIFS after a first BA ends, so that waiting time before the retransmission is reduced. In this case, there may be more time for transmitting new data, thereby increasing link throughput.

In some possible designs, an end moment of the second PPDU is the same as that of a fourth PPDU on the second link, and the fourth PPDU is used to retransmit an error part in the third PPDU.

Based on the possible designs, the transmitter MLD may be enabled to synchronously perform error recovery on the first link and the second link. Therefore, PPDUs transmitted on the first link and the second link may be synchronized, thereby avoiding a case in which data needs to be transmitted and received at the same time on a non-STR MLD side.

According to a second aspect, a link error recovery method is provided, where the method is applied to a transmitter MLD, a plurality of links between the transmitter MLD and a receiver MLD include a first link, and the transmitter MLD has a simultaneous transmitting and receiving STR capability while the receiver MLD does not have the STR capability. The method includes: The transmitter MLD determines that transmission of a first physical protocol data unit PPDU on the first link fails; and the transmitter MLD transmits a second PPDU to the receiver MLD at a first moment by using the first link, the second PPDU being used to retransmit an error part in the first PPDU, where the first moment is a predicted end moment of a first acknowledgement block BA, and the first BA is a BA of the first PPDU.

Based on this solution, on one hand, in a scenario in which the transmitter MLD has the STR capability while the receiver MLD does not have the STR capability, and transmission of the first PPDU on the first link fails, the transmitter MLD may transmit the second PPDU at the first moment to retransmit the error part in the first PPDU, thereby implementing error recovery of the first link. On the other hand, by transmitting the second PPDU at the predicted end moment of the first BA, link recovery may be implemented earlier as compared with a case in which the second PPDU is transmitted at a moment that is at an interval of PIFS from an end moment of the first BA, so that waiting time before retransmission is reduced. In this case, there may be more time for transmitting new data, thereby increasing link throughput.

According to a third aspect, a link error recovery method is provided, where the method is applied to a transmitter MLD, a plurality of links between the transmitter MLD and a receiver MLD include a first link, the transmitter MLD has a simultaneous transmitting and receiving STR capability while the receiver MLD does not have the STR capability, and the method includes: The transmitter MLD determines that transmission of a first physical protocol data unit PPDU or a first acknowledgement block BA on the first link fails, where the first BA is a BA of the first PPDU; the transmitter MLD starts to perform channel backoff at a first moment, where the first moment is an end moment of the first BA; and after the channel backoff ends, the transmitter MLD transmits a second PPDU to the receiver MLD by using the first link, where the second PPDU is used to retransmit an error part in the first PPDU.

With reference to the second aspect and the third aspect, in some possible designs, the links between the transmitter MLD and the receiver MLD further include a second link, an end moment of the first PPDU is the same as that of a third PPDU on the second link, and an end moment of the second PPDU is the same as that of a fourth PPDU on the second link.

According to a fourth aspect, a link error recovery method is provided, where the method is applied to a transmitter MLD, a plurality of links between the transmitter MLD and a receiver MLD include a first link, one of the transmitter MLD and the receiver MLD has a simultaneous transmitting and receiving STR capability while the other does not have the STR capability, and the method includes: The transmitter MLD receives a first block acknowledgement BA on the first link, where the first BA is a BA of a first physical protocol data unit PPDU; and the transmitter MLD transmits a second PPDU to the receiver MLD by using the first link, where an interval between a start moment of the second PPDU and an end moment of the first BA is interframe space, and the interframe space is point coordination function interframe space PIFS.

Based on this solution, when the interframe space after the BA is PIFS, on one hand, even if transmission of a PPDU or BA on a link fails, transmission status information on another link does not need to be obtained when the transmitter MLD performs error recovery on this link. In this case, internal information exchange of the transmitter MLD is avoided, and power consumption of the transmitter MLD is reduced. On the other hand, because interframe space after a BA on each link is PIFS, and interframe space after a PPDU is SIFS, synchronous transmission may be implemented even if the transmission status information on another link does not need to be obtained during error recovery of a link. In this way, a case in which a non-STR MLD needs to simultaneously transmit and receive data is avoided.

According to a fifth aspect, a communication apparatus is provided to implement the foregoing methods. The communication apparatus may be the transmitter MLD in the first aspect to the fourth aspect, or may be an apparatus including the transmitter MLD, or may be an apparatus, for example, a system chip, included in the transmitter MLD. The communication apparatus includes a corresponding module, unit, or means for implementing the foregoing method. The module, unit, or means may be implemented by hardware, software, or hardware executing corresponding software. The hardware or software includes one or more modules or units corresponding to the foregoing functions.

According to a sixth aspect, a communication apparatus is provided, where the communication apparatus includes a processor and a memory, and the memory is configured to store computer instructions, and when the processor executes the instructions, the communication apparatus performs the method in any one of the foregoing aspects. The communication apparatus may be the transmitter MLD in the first aspect to the fourth aspect, or may be an apparatus including the transmitter MLD, or may be an apparatus, for example, a system chip, included in the transmitter MLD.

According to a seventh aspect, a communication apparatus is provided, where the communication apparatus includes a processor, and the processor is configured to: after being coupled to a memory and reading instructions in the memory, perform the method in any one of the foregoing aspects based on the instructions. The communication apparatus may be the transmitter MLD in the first aspect to the fourth aspect, or may be an apparatus including the transmitter MLD, or may be an apparatus, for example, a system chip, included in the transmitter MLD.

According to an eighth aspect, a computer-readable storage medium is provided, where the computer-readable storage medium stores instructions, and when the instructions are run on a communication apparatus, the communication apparatus is enabled to implement the method in any one of the foregoing aspects. The communication apparatus may be the transmitter MLD in the first aspect to the fourth aspect, or may be an apparatus including the transmitter MLD, or may be an apparatus, for example, a system chip, included in the transmitter MLD.

According to a ninth aspect, a computer program product including instructions is provided, where when the instructions are run on a communication apparatus, the communication apparatus is enabled to implement the method in any one of the foregoing aspects. The communication apparatus may be the transmitter MLD in the first aspect to the fourth aspect, or may be an apparatus including the transmitter MLD, or may be an apparatus, for example, a system chip, included in the transmitter MLD.

According to a tenth aspect, a communication apparatus (for example, the communication apparatus may be a chip or a chip system) is provided, where the communication apparatus includes a processor, and is configured to implement a function involved in any one of the foregoing aspects. In a possible design, the communication apparatus further includes a memory, and the memory is configured to store necessary program instructions and data. When the communication apparatus is a chip system, the chip system may include a chip, or include a chip and other discrete devices.

According to an eleventh aspect, a chip is provided, where the chip includes a processor and a communication interface, the communication interface is configured to communicate with a module outside the chip, and the processor is configured to run a computer program or instructions, so that an apparatus mounted with the chip can perform the method according to any one of the foregoing aspects.

For technical effects brought by any one of design manners in the fifth aspect to the eleventh aspect, refer to technical effects brought by different design manners in the first aspect, the second aspect, the third aspect, or the fourth aspect. Details are not described herein again.

According to a twelfth aspect, a communication system is provided, where the communication system includes the transmitter MLD and the receiver MLD according to the foregoing aspects.

These aspects or other aspects of this application are clearer and more comprehensible in the following descriptions of the embodiments.

BRIEF DESCRIPTION OF DRAWINGS

FIG. 1a is a schematic diagram of a structure of a PPDU according to an embodiment of this application;

DESCRIPTION OF EMBODIMENTS

In the descriptions of this application, "/" represents an "or" relationship between associated objects unless otherwise specified. For example, AB may represent A or B. The term "and/or" in this application represents only an association relationship for describing associated objects and represents that three relationships may exist. For example, A and/or B may represent the following three cases: Only A exists, both A and B exist, and only B exists, where A and B may be singular or plural. In addition, in the descriptions of this application, "a plurality of" means two or more than two unless otherwise specified. "At least one of the following items (pieces)" or a similar expression thereof means any combination of these items, including any combination of singular items (pieces) or plural items (pieces). For example, at least one (piece) of a, b, or c may represent: a, b, c, a and b, a and c, b and c, or a, b, and c, where a, b, and c may be singular or plural. In addition, to clearly describe the technical solutions in the embodiments of this application, terms such as "first" and "second" are used in the embodiments of this application to distinguish between same items or similar items that provide basically same functions or purposes. A person skilled in the art may understand that the terms such as "first" and "second" do not limit a quantity and an execution sequence, and the terms such as "first" and "second" do not indicate a definite difference.

It should be noted that, in this application, the term such as "example" or "for example" is used to represent giving an example, an illustration, or a description. Any embodiment or design scheme described as an "example" or "for example" in this application should not be explained as being more preferred or having more advantages than another embodiment or design scheme. Exactly, use of the term such as "example" or "for example" is intended to present a related concept in a specific manner.

For ease of understanding, the following first briefly describes technical terms in the embodiments of this application.

1. Physical Protocol Data Unit (PPDU)

Figure 1A:
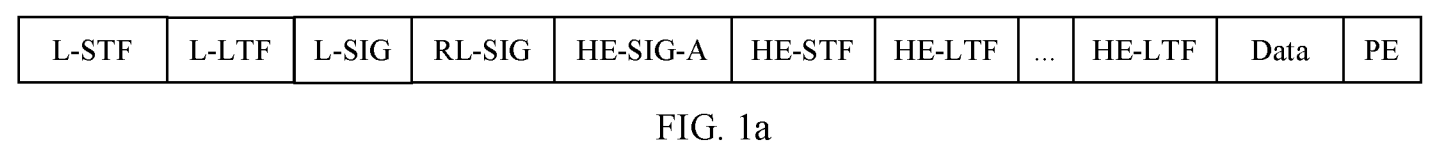

FIG. 1a is a schematic diagram of a frame structure of a PPDU in the 802.11ax standard. The PPDU includes: a legacy short training field (L-STF), a legacy long training field (L-LTF), a legacy signal field (L-SIG), a repeated legacy signal field (RL-SIG), a high efficient signal field A (HE-SIG A), a high efficient signal field B (HE-SIG B), a high efficiency-short training field (HE-STF), a high efficiency-long training field (HE-LTF), and data. Optionally, the PPDU may further include data packet extension (PE).

Figure 1B:
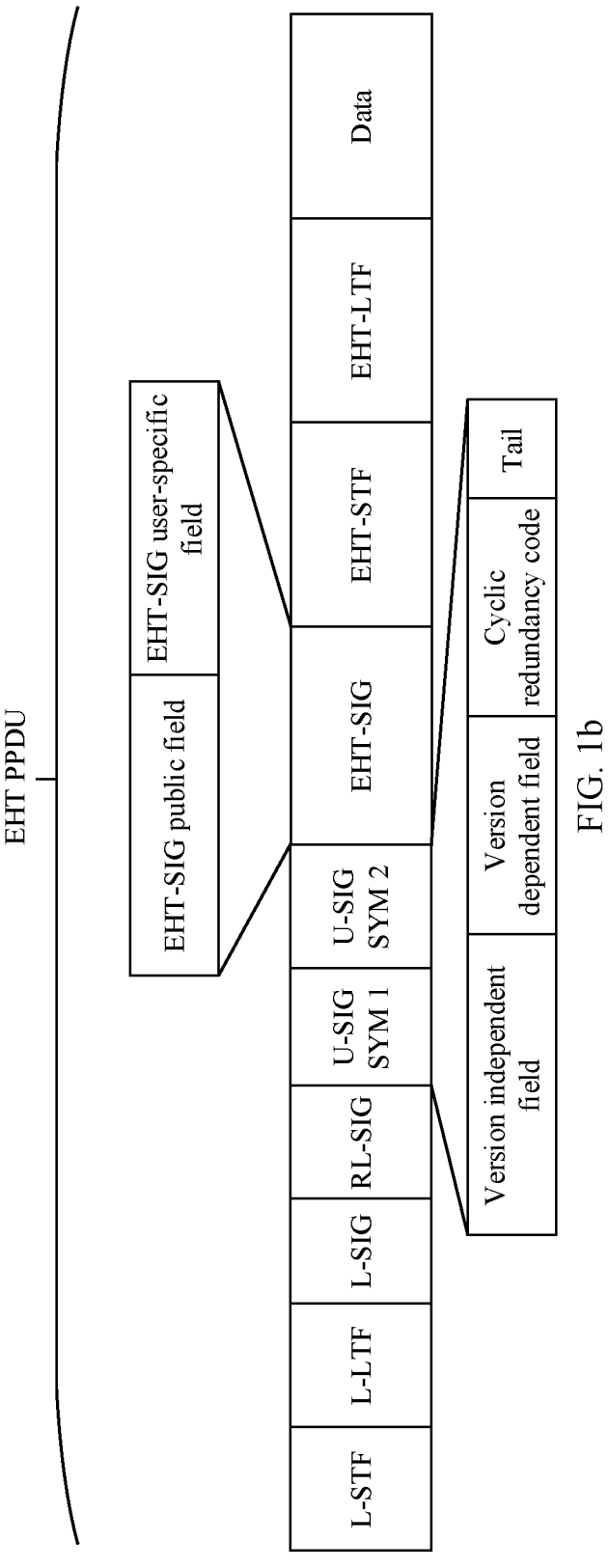
FIG. 1b is a schematic diagram of a structure of another PPDU according to an embodiment of this application.

Referring to FIG. 1b, a structure of a PPDU with extremely high throughput (EHT) that may be used in 802.11be is shown. The EHT PPDU may include three parts: a legacy preamble (L-preamble), a high efficiency preamble (HE-preamble), and a physical layer convergence service data unit (PSDU).

The L-preamble part includes an L-STF field, an L-LTF field, and an L-SIG field. The HE-preamble part includes an RL-SIG field, a universal field (universal SIG, U-SIG), an extremely high throughput signal (EHT-SIG) field, an extremely high throughput short training (EHT-STF) field, and an extremely high throughput long training (EHT-LTF) field. The PSDU part includes fields such as a data field. The U-SIG field occupies two OFDM symbols, such as U-SIG SYM1 and U-SIG SYM2 shown in FIG. 1b. The universal field (U-SIG) field may include a version independent information field, a version dependent information field, a CRC field, and a tail field. The version independent info field may include a 3-bit Wi-Fi version field, a 1-bit downlink/uplink field, a BSS color field that occupies at least 6 bits, and a TXOP field that occupies at least 7 bits. Further, the version independent info field may further include a bandwidth field. The version dependent info field may include a PPDU format field and the like, and may further include one or more of a modulation and coding scheme field, a spatial flow field, an encoding field, and other fields. The CRC field occupies at least 4 bits, and the tail field occupies at least a 6-bit.

In a possible implementation, the EHT-SIG field includes an EHT-SIG public field and an EHT-SIG user-specific field. The EHT-SIG public field may be used to carry resource allocation information allocated to a STA. The EHT-SIG user-specific field may be used to carry user information.

It should be understood that the EHT-PPDU is merely an example. In a standard formulation process or a technology development process, another structure may also be used. This is not limited in this application.

2. Transmission Opportunity (TXOP)

TXOP is a basic unit of radio channel access. The TXOP consists of initial time and maximum duration TXOP limit.

To avoid collision as far as possible, after completing transmission of a frame, a device needs to wait for a short period of time before transmitting a next frame. This period of time is generally referred to as interframe space (IFS). Currently, the interframe space is usually short interframe space (SIFS).

Figure 1C:
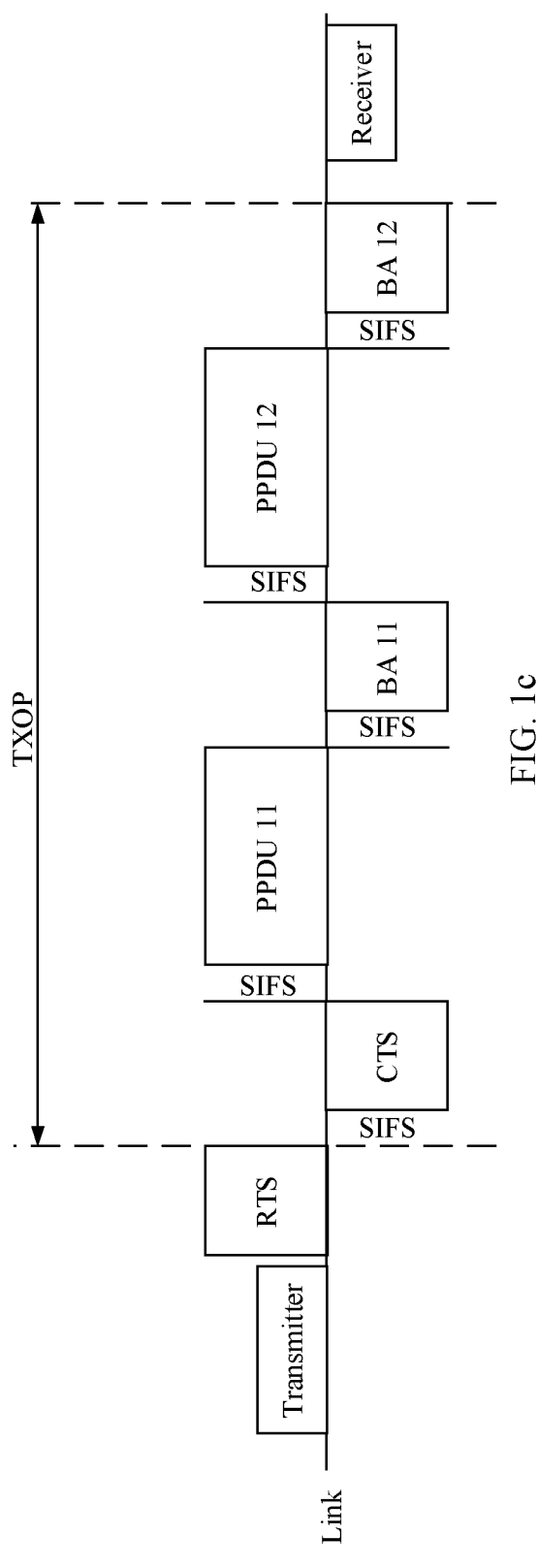
FIG. 1c is a schematic diagram of a structure of a transmission opportunity TXOP according to an embodiment of this application.

For example, an example in which the interframe space is SIFS is used. FIG. 1c is a schematic diagram of normal transmission of a PPDU in a TXOP. A transmitter device starts to transmit a PPDU 11 after a time interval of SIFS after a clear to send (CTS) frame is received; and receive a block acknowledgement (BA) frame BA 11 that is from a receiver device after a time interval of SIFS. The BA 11 is used to feed back to a transmitter whether the PPDU 11 is successfully transmitted. If the PPDU 11 is successfully transmitted, the transmitter device continues to transmit a PPDU 12 at a time interval of SIFS after the BA 11 frame ends. The others may be deduced by analogy.

RTS in FIG. 1c is request to send (RTS). The RTS/CTS is used to resolve a problem of hidden stations, thereby avoiding signal conflicts among a plurality of stations. Before transmitting a data frame, the transmitter first transmits an RTS frame in a broadcast manner, so that the transmitter is indicated to transmit the data frame to a specified receiver after specified duration. After receiving the RTS frame, the receiver transmits a CTS frame in a broadcast manner, to confirm transmission of the transmitter. No radio frame is transmitted by another station that receives the RTS frame or the CTS frame, until the specified duration ends.

3. Error Recovery

After a transmission opportunity (TXOP) is successfully established, if transmission of a PPDU in the TXOP fails, error recovery of the link is triggered.

The error recovery includes point coordination function interframe space (PIFS) error recovery and backoff error recovery, which are separately described below.

(1) PIFS error recovery: After idle duration of a channel reaches PIFS, a next PPDU is transmitted on the channel by a device.

When idle time of the channel reaches PIFS, a next PPDU is transmitted. This may be referred to as PIFS error recovery.

(2) Backoff error recovery: Channel backoff is performed, and a next PPDU is transmitted after the backoff ends.

The IEEE 802.11 standard supports a plurality of users sharing a same transmission medium. A transmitter checks availability of the transmission medium before transmitting data. The IEEE 802.11 standard uses carrier sense multiple access with collision avoidance (CSMA/CA) to achieve channel contention. The CSMA/CA uses a backoff mechanism to avoid collision.

The backoff mechanism on a single channel is described below. Before transmitting a message, a device may select a random number from 0 to a contention window (CW), and use the random number as an initial value of a backoff counter. After the idle time of the channel reaches arbitration interframe space (AIFS), a count value of the backoff counter is subtracted by 1 each time the channel is idle for one timeslot. Before the count value of the backoff counter is subtracted to 0, if the channel is busy in a timeslot, the backoff counter suspends counting. Then, if the channel changes from a busy state to an idle state and the idle time of the channel reaches the AIFS, the backoff counter resumes counting. When the count value of the backoff counter is 0, a backoff procedure ends, and the device may start data transmission.

Figure 2:
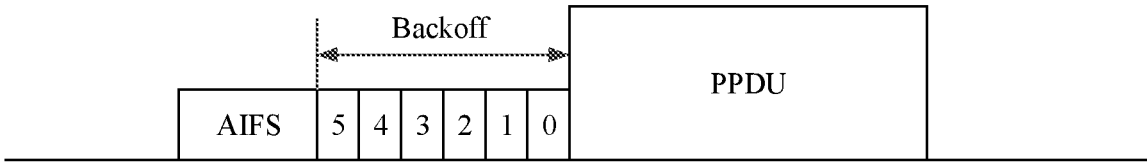
FIG. 2 is a schematic flowchart of a backoff mechanism according to an embodiment of this application.

For example, with reference to FIG. 2, assuming that the initial value of the backoff counter is 5, the backoff counter starts to perform backoff after the idle time of the channel reaches the AIFS. Each time the channel is in the idle state in one timeslot, the count value of the backoff counter is subtracted by 1 until the count value of the backoff counter is 0. After the count value of the backoff counter is 0, the device successfully contends for a channel, and the device may transmit a PPDU on the channel.

Figure 3:
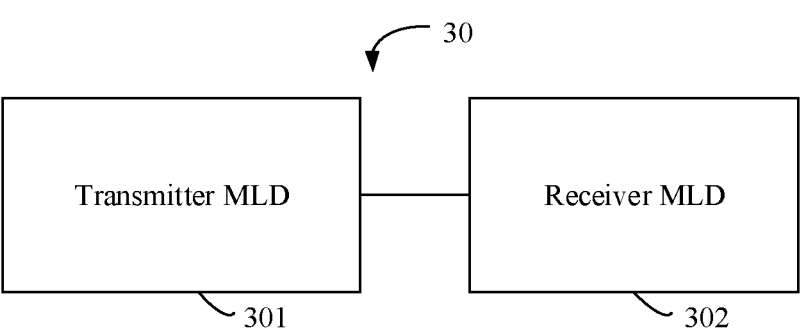
FIG. 3 is a schematic diagram of a structure of a communication system according to an embodiment of this application.

A communication system provided in embodiments of this application is described below. FIG. 3 is a schematic diagram of a structure of a communication system 30 according to an embodiment of this application. The communication system 30 includes a transmitter MLD 301 and a receiver MLD 302.

In this application, an MLD (including the transmitter MLD 301 and the receiver MLD 302) has a capability of transmitting and receiving on a plurality of frequency bands. Compared with a device that supports only transmission on a single link, the multi-link device has higher transmission efficiency and higher throughput. For example, the plurality of frequency bands include but are not limited to a 2.4 GHz frequency band, a 5 GHz frequency band, and a 6 GHz frequency band. A spatial path on which the MLD performs data transmission on one frequency band may be referred to as a link. That is, the MLD supports multi-link communication.

It should be understood that, for the MLD, each link supported by the MLD corresponds to one frequency band.

It should be noted that, in this application, the MLD may also be referred to as a multi-band device, and the MLD and the multi-band device may be replaced with each other. This is not specifically limited in this embodiment of this application.

MLDs may be classified into STR MLDs and non-STR MLDs. The STR MLD has an STR capability, while the non-STR MLD does not have the STR capability.

In this application, the MLD includes at least two affiliated stations (affiliated STAs). The affiliated station may be an access point (STA) or a non-access point station (non-AP STA). For ease of description, in this application, a multi-link device whose affiliated station is an AP is referred to as a multi-link AP, a multi-link AP device, or an AP multi-link device (AP MLD); and a multi-link device whose affiliated station is a non-AP STA is referred to as a multi-link STA, a multi-link STA device, a STA multi-link device (STA MLD), or a non-AP multi-link device (non-AP MLD).

In an implementation, the non-AP STA can implement a function of the AP. In other words, the non-AP STA can be operated as an AP. The non-AP STA that can implement the function of the AP or an MLD including the non-AP MLD that can be operated as an AP may be referred to as a soft AP MLD.

It may be understood that AP MLDs may be classified into STR AP MLDs and non-STR AP MLDs. The STR AP MLD has an STR capability, while the non-STR AP MLD does not have the STR capability. Similarly, non-AP MLDs may be classified into STR non-AP MLDs and non-STR non-AP MLDs. The STR non-AP MLD has an STR capability, while the non-STR non-AP MLD does not have the STR capability.

In this embodiment of this application, the non-STRAP MLD may include the soft AP MLD. Certainly, the non-STRAP MLD is not limited to the soft AP MLD.

Figure 4:
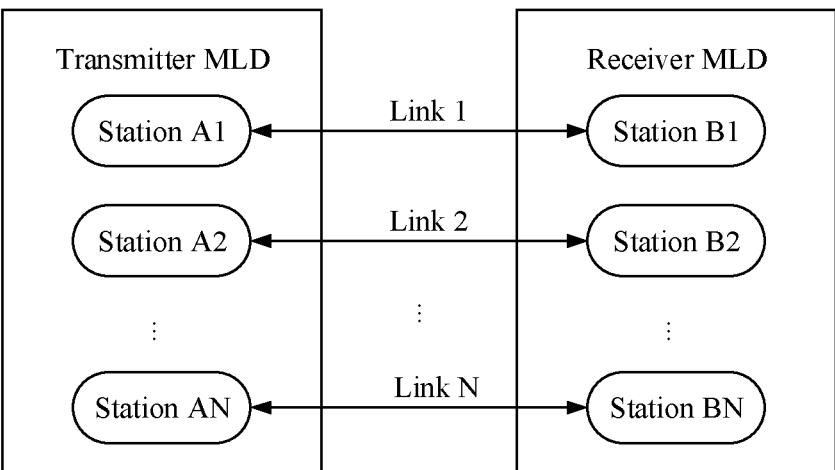
FIG. 4 is a schematic diagram of a communication scenario according to an embodiment of this application.

Each STA in the MLD may establish one link for communication. As shown in FIG. 4, an example in which the transmitter MLD 301 includes stations A1 to AN, and the receiver MLD includes stations B1 to BN is used. The station A1 communicates with the station B1 by using a link 1, and a station A2 communicates with a station B2 by using a link 2. By analogy, the station AN communicates with the station BN by using a link N.

In the following embodiments of this application, description is made by using an example in which a plurality of links between the transmitter MLD 310 and the receiver MLD 320 include a first link and a second link.

Optionally, the AP STA in this application may be an access point for a mobile user to access a wired network, and is mainly deployed in a house, a building, and a campus. A typical coverage radius is tens of meters to a hundred meters. Certainly, the AP STA may alternatively be deployed outdoors. The AP is equivalent to a bridge that connects a wired network and a wireless network. A main function of the AP is to connect wireless network clients together, and then connect the wireless network to the Ethernet. Specifically, the AP may be a terminal device or a network device with a wireless fidelity (Wi-Fi) chip. The AP may be a device that supports the 802.11be standard. Alternatively, the AP may be a device that supports a plurality of wireless local area network (WLAN) standards such as 802.11ax, 802.11ac, 802.11n, 802.11g, 802.11b, and 802.11a.

Optionally, the non-AP STA in this application may be a wireless communication chip, a wireless sensor, or a wireless communication terminal. For example, the non-AP STA may be a mobile phone that supports a Wi-Fi communication function, a tablet computer that supports a Wi-Fi communication function, a set top box that supports a Wi-Fi communication function, a smart television that supports a Wi-Fi communication function, a smart wearable device that supports a Wi-Fi communication function, a vehicle-mounted communication device that supports a Wi-Fi communication function, or a computer that supports a Wi-Fi communication function. The non-AP STA may support the 802.11be standard. The non-AP STA may also support a plurality of WLAN standards such as 802.11ax, 802.11ac, 802.11n, 802.11g, 802.11b, and 802.11a.

It should be noted that in this embodiment of this application, the BA may be understood as a response frame. In addition, the response frame may further include an acknowledgement ACK (ACK). Therefore, the BA in this application may also be replaced with the ACK. That is, the BA in this application indicates only a response frame. However, the response frame is not necessarily a BA, and may alternatively be an ACK.

The following specifically describes the technical solutions provided in the embodiments of this application with reference to the accompanying drawings of the specification.

First, an embodiment of this application provides a link error recovery method. The method may be applied to a scenario in which PPDU transmission failures occur on both a first link and a second link between a transmitter MLD and a receiver MLD in synchronous multi-link communication.

Figure 5:
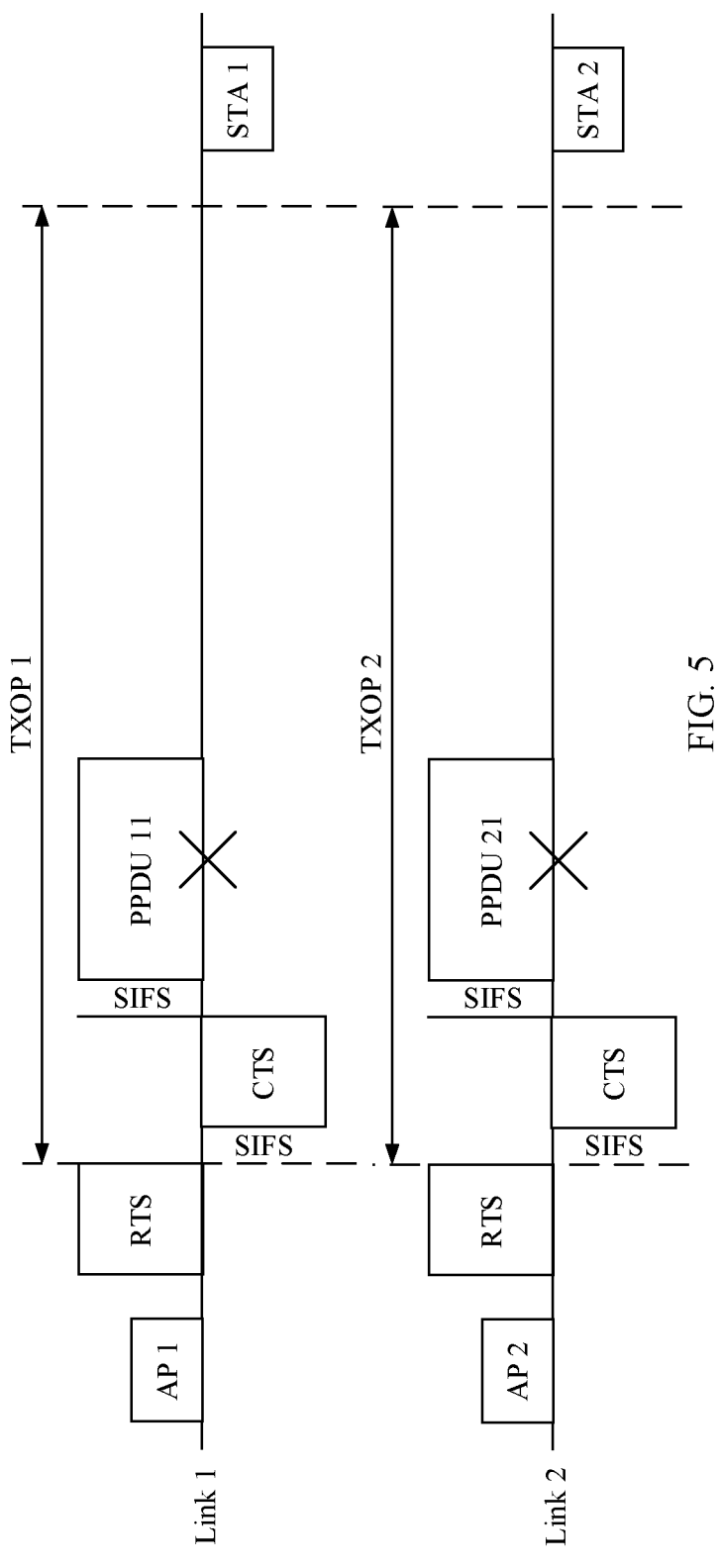
FIG. 5 is a schematic diagram of a scenario to which an error recovery method is applicable according to an embodiment of this application.

For example, the transmitter MLD is an AP MLD, and the receiver MLD is a non-STR STA MLD. If the AP MLD includes two stations, an AP 1 and an AP 2, where the AP 1 supports a link 1, and the AP2 supports a link 2; and the non-STR STA MLD includes a STA 1 and a STA 2, where the STA 1 communicates with the AP 1 by using the link 1, and the STA 2 communicates with the AP 2 by using the link 2, this scenario may be as shown in FIG. 5. Cross indicates that transmission fails.

Certainly, an application scenario of the method is merely described herein as an example. The application scenario of the method is not specifically limited in this embodiment of this application. The application scenario described herein as an example also does not impose any limitation on the method according to this embodiment of this application.

The method may be performed by the transmitter MLD, or by a component (for example, a chip) that may be used in the transmitter MLD. In this application, description is made by using an example in which the method is performed by the transmitter MLD. In addition, in this method, one of the transmitter MLD and the receiver MLD has an STR capability, while the other does not have the STR capability. In other words, one of the transmitter MLD and the receiver MLD is an STR MLD, and the other is a non-STR MLD.

Figure 6:
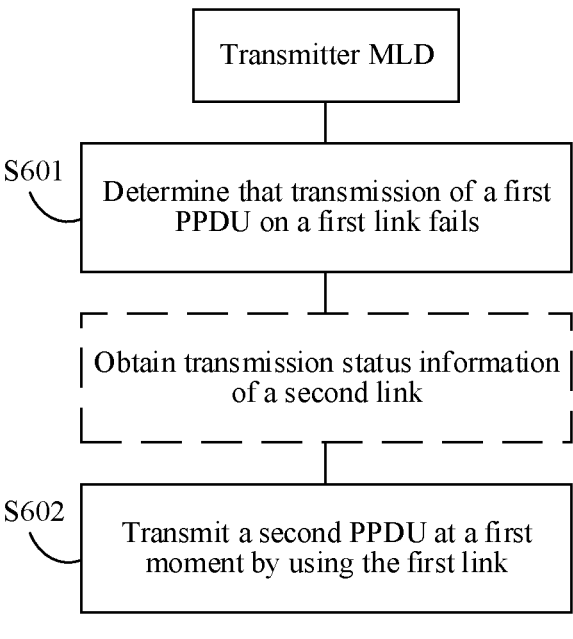
FIG. 6 is a schematic flowchart of a link error recovery method according to an embodiment of this application.

FIG. 6 is a schematic flowchart of the link error recovery method. The link error recovery method includes the following steps.

S601. A transmitter MLD determines that transmission of a first PPDU on a first link fails.

Optionally, that a transmitter MLD determines that transmission of a first PPDU on a first link fails may include: when the transmitter MLD does not receive a BA of the first PPDU, the transmitter MLD determines that transmission of the first PPDU fails.

Optionally, a transmission failure of the first PPDU may include a transmission failure of some or all content included in the first PPDU.

S602. The transmitter MLD transmits a second PPDU to a receiver MLD at a first moment by using the first link. Correspondingly, the receiver MLD receives the second PPDU that is from the transmitter MLD by using the first link.

The second PPDU is used to retransmit an error part in the first PPDU.

It may be understood that step S602 may also be: the transmitter MLD retransmits, at the first moment, an error part in the first PPDU to the receiver MLD by using the first link.

Transmitting the second PPDU by using the first link may also be understood as transmitting the second PPDU on the first link, and the two may be replaced with each other.

In this case, when transmission of the first PPDU fails, because the error part in the first PPDU is retransmitted by the transmitter MLD, it may be considered as that the transmitter MLD completes error recovery of the first link.

Optionally, that the transmitter MLD transmits a second PPDU to a receiver MLD at a first moment by using the first link may include: when the first link is idle during a first time period, the transmitter MLD transmits the second PPDU to the receiver MLD at the first moment by using the first link. An end moment of the first time period is the first moment, and duration of the first time period is PIFS or TBD (To Be Decided) time.

Optionally, the transmitter MLD may determine whether the first link is idle during the first time period by performing clear channel assessment (CCA).

In another implementation, duration of the first time period is SIFS.

Optionally, the transmitter MLD may use energy detection (ED) as a detection manner for determining whether the first link is idle in the SIFS.

Optionally, the transmitter MLD may reduce an ED threshold, for example, reduce the ED threshold from −62 dbm in current 20-MHz channel space to −72 dbm.

When the transmitter MLD determines that the first link is idle during the first time period, for example, CCA is passed during the first time period, step S602 is performed.

It may be understood that, if the transmission failure on the second link is a transmission failure of a third PPDU on the second link, the transmitter MLD may retransmit an error part in the third PPDU at the first moment. That is, the transmitter MLD synchronously performs error recovery on the first link and the second link. Therefore, PPDUs transmitted on the first link and the second link may be synchronized, thereby avoiding a case in which data is transmitted and received at the same time on a non-STR MLD side.

In this case, an end moment of the second PPDU is the same as that of a fourth PPDU on the second link, and the fourth PPDU is used to retransmit the error part in the third PPDU.

Optionally, after receiving the second PPDU, the receiver MLD may transmit a BA of the second PPDU to the transmitter MLD, or may perform service processing based on the second PPDU. This is not specifically limited in this embodiment of this application.

The first moment in this embodiment is described in detail below. In different implementations of this embodiment of this application, the first moment may also be different.

In a possible implementation, the first moment is a moment at which the transmitter MLD obtains transmission status information of the second link.

The transmission status information of the second link is used to indicate that transmission of the third PPDU on the second link fails.

It should be understood that, in synchronous multi-link transmission, an end moment of the third PPDU is the same as that of the first PPDU.

That is, in this possible implementation, before step S602, the transmitter MLD needs to obtain the transmission status information of the second link. Optionally, from a perspective of internal implementation of the transmitter MLD, the transmission status information of the second link may be obtained by a first station, and the first station is a station that is in the transmitter MLD and supports the first link.

Optionally, that the first station obtains the transmission status information of the second link may include: the first station receives the transmission status information of the second link that is from a second station, where the second station is a station that is in the transmitter MLD and supports the second link. That is, before step S602, the method may further include: The second station transmits the transmission status information of the second link to the first station. Correspondingly, the first station receives the transmission status information of the second link that is from the second station.

Optionally, in this possible implementation, when an interval between the moment at which the transmitter MLD obtains the transmission status information of the second link and a predicted start moment of a first BA is less than or equal to first duration, the moment at which the transmission status information of the second link is obtained is determined as the first moment by the transmitter MLD. In other words, the first moment is the moment at which the transmitter MLD obtains the transmission status information of the second link. The first BA is a BA of the first PPDU, and the first duration is a sum of a length of the first BA and the SIFS.

It may be understood that, the solution may also be described as below: When an interval between the moment at which the transmitter MLD obtains the transmission status information of the second link and a predicted end moment of the first BA is less than or equal to the first duration, and the first duration is SIFS, the moment at which the transmission status information of the second link is obtained is determined as the first moment by the transmitter MLD. In other words, the first moment is the moment at which the transmitter MLD obtains the transmission status information of the second link.

It may be understood that the predicted start moment of the first BA may be a moment at which the transmitter MLD receives the first BA if the first PPDU is normally transmitted, or an interval between the predicted start moment of the first BA and the end moment of the first PPDU is SIFS. The predicted end moment of the first BA may be a moment that is at an interval of the length of the first BA from the moment at which the transmitter MLD receives the first BA if the first PPDU is normally transmitted. In other words, an interval between the predicted end moment of the first BA and the end moment of the first PPDU is a sum of the SIFS and the length of the first BA.

It may be understood that the predicted start moment of the first BA may be a moment at which the transmitter MLD receives the first BA if the first PPDU is normally transmitted, and a moment at which a transmitter receives the first BA when the first PPDU is normally transmitted is referred to as a start moment of the first BA or an actual start moment of the first BA. Therefore, in this application, the predicted start moment of the first BA may be the same as the actual start moment of the first BA. Therefore, in subsequent embodiments, the predicted start moment of the first BA and the start moment of the first BA may be a same moment. Similarly, the predicted end moment of the first BA and an end moment of the first BA may be a same moment. For a predicted start moment and a predicted end moment of a BA of another PPDU other than the first PPDU in the following embodiments, refer to related descriptions of the first BA.

Optionally, the predicted start moment of the first BA is earlier than the moment at which the transmitter MLD obtains the transmission status information of the second link.

It may be understood that the interval between the predicted start moment of the first BA and the end moment of the first PPDU is SIFS.

For example, the start moment of the first BA is represented by using t1, the moment at which the transmitter MLD obtains the transmission status information of the second link is represented by using t2, and the length of the first BA is represented by using $L_{BA}$. Determining the first moment by the transmitter MLD may include: determining t2 as the first moment in a case of $t2-t1 \leq L_{BA}+SIFS$, or determining t2 as the first moment in a case of $t2-L_{BA}-t1 \leq SIFS$.

Based on this solution, because the moment at which the transmitter obtains the transmission status information of the second link or the moment at which the transmitter transmits the second PPDU is earlier than the SIFS after the first BA, and the SIFS is less than the PIFS, link recovery may be implemented earlier as compared with the conventional technology in which a failed PPDU is retransmitted at a moment that is at an interval of PIFS after the first BA ends, so that waiting time before the retransmission is reduced. In this case, there may be more time for transmitting new data, thereby increasing link throughput.

It may be understood that, a header of the BA includes a RESTART indication of the BA. Therefore, in this embodiment of this application, the predicted start moment of the first BA may also be referred to as a predicted start moment of the RESTART indication of the first BA, or may be referred to as a moment at which the transmitter MLD is predicted to receive the RESTART of the first BA. This is not specifically limited in this embodiment of this application.

Optionally, in this possible implementation, after transmission of the first PPDU fails, the transmitter MLD also obtains transmission status information of the first link. In other words, the first station transmits the transmission status information of the first link to the second station, where the transmission status information of the first link is used to indicate that transmission of the first PPDU fails.

Optionally, due to synchronous transmission, the transmitter MLD may obtain the transmission status information of the first link and the transmission status information of the second link at the same time. In other words, a moment at which the first station receives the transmission status information of the second link is the same as a moment at which the second station receives the transmission status information of the first link.

Optionally, for the second link, the first moment in this implementation may also be understood as a moment at which the transmitter MLD (or the second station) obtains the transmission status information of the first link.

For error recovery of the second link, the transmitter MLD performs a process similar to that of the error recovery of the first link. In other words, the second station performs a method similar to that of the first station, to perform the error recovery of the second link. For details, refer to the foregoing related descriptions. Details are not described herein again.

This implementation is described below by using a specific example.

Figure 7:
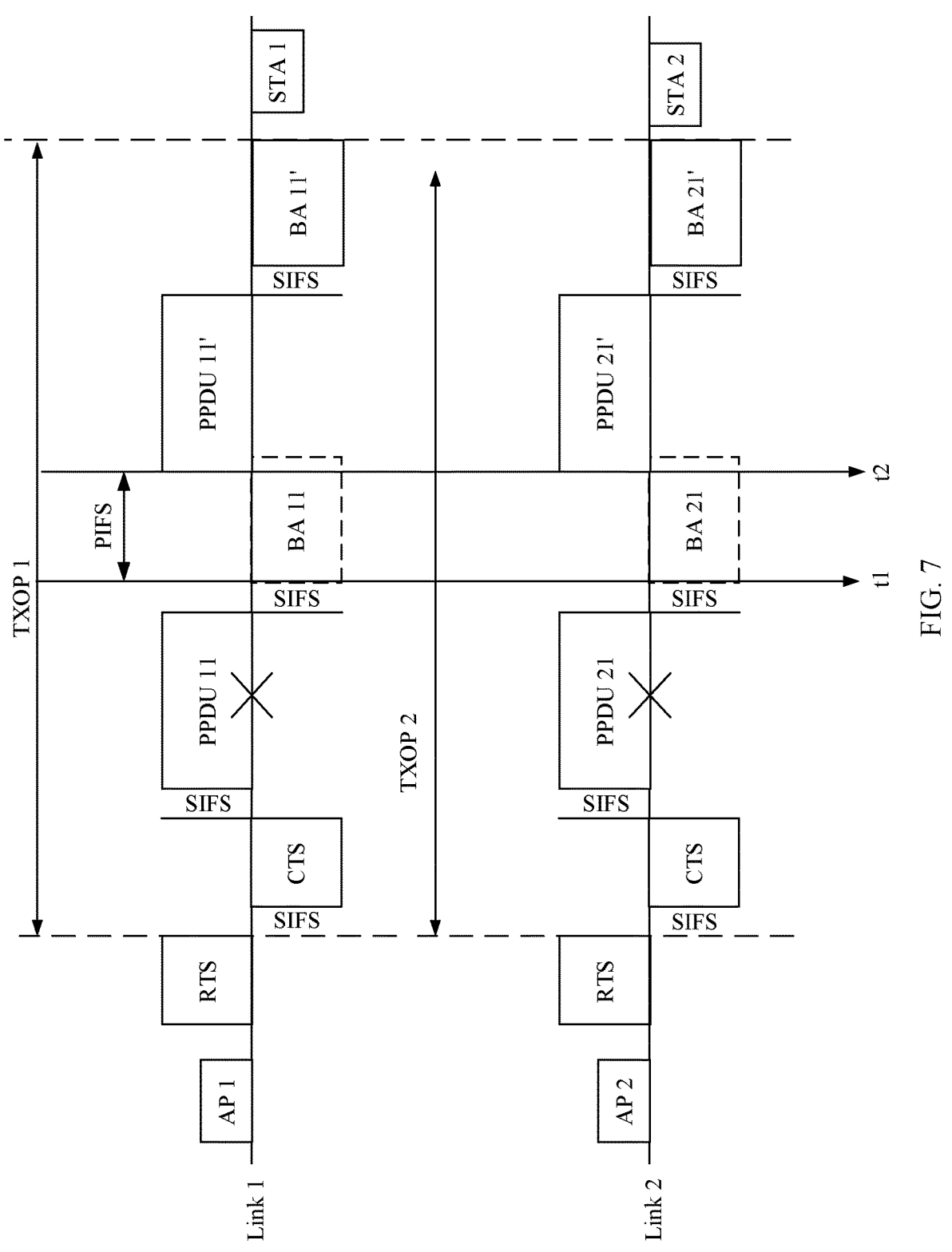
FIG. 7 to FIG. 10 are schematic diagrams of application of a link error recovery method according to an embodiment of this application.

For example, based on the scenario shown in FIG. 5, an example in which the first link is the link 1, the second link is the link 2, the first PPDU is a PPDU 11, the third PPDU is a PPDU 21, the first BA is a BA 11, and a BA of the PPDU 21 is a BA 21 is used. As shown in FIG. 7, if the AP 1 does not receive the BA 11 after duration of SIFS from the end moment of the first PPDU, the AP MLD (or the AP 1) may determine that transmission of the PPDU 11 on the link 1 fails. Subsequently, after obtaining the transmission status information of the link 2 at t2 (that is, the first moment), the AP MLD (or the AP 1) transmits a PPDU 11' at t2 by using the link 1, where the PPDU 11' may be understood as the second PPDU.

A BA in a dashed box means that the BA is not received, and dashed boxes in the subsequent drawings also indicate that the content in the boxes is not received. This is described herein uniformly, and details are not described in the following embodiments.

Similarly, if the AP 2 does not receive the BA 21 after duration of SIFS from the end moment of the third PPDU, the AP MLD (or the AP 2) may determine that transmission of the PPDU 21 on the link 2 fails. Subsequently, after obtaining the transmission status information of the link 1 at t2 (that is, the first moment), the AP MLD (or the AP 2) transmits a PPDU 21' at t2 by using the link 2, where the PPDU 21' may be understood as the fourth PPDU.

In another possible implementation, the first moment is a moment for transmitting a next PPDU on the first link if the first PPDU is normally transmitted.

It may be understood that, if the first PPDU is normally transmitted, the moment for transmitting a next PPDU on the first link is obtained by adding the end moment of the first PPDU, the length of the first BA, and two SIFSs.

For example, if time for transmitting a next PPDU is represented by using t3, and the end moment of the first PPDU is represented by using t4, it may be represented as $t3=t4+L_{BA}+2SIFS$.

Optionally, in this possible implementation, if the transmitter MLD does not obtain the transmission status information of the second link before the second moment, the transmitter MLD determines the moment for transmitting a next PPDU on the first link if the first PPDU is normally transmitted as the first moment. In other words, the first moment is the moment for transmitting a next PPDU on the first link if the first PPDU is normally transmitted.

It may be understood that the second moment is the moment for transmitting a next PPDU on the first link if the first PPDU is normally transmitted. Therefore, it may also be considered that if the first PPDU is normally transmitted, when the transmitter MLD does not obtain the transmission status information of the second link before the moment for transmitting a next PPDU on the first link, the first moment is the moment for transmitting a next PPDU on the first link if the first PPDU is normally transmitted.

Optionally, from a perspective of internal implementation of the transmitter MLD, that the transmitter MLD does not obtain the transmission status information of the second link may be that the first station does not obtain the transmission status information of the second link.

Optionally, a delay in information exchange between the first station and the second station may be excessively large. As a result, at the moment for transmitting a next PPDU when the first PPDU is normally transmitted, the first station still does not obtain the transmission status information of the second link.

For example, the moment for transmitting a next PPDU is represented by using t3. Determining the first moment by the transmitter MLD may include: when the transmitter MLD does not obtain the transmission status information of the second link at the moment t3, the transmitter MLD determines t3 as the first moment.

Based on this solution, because the SIFS is less than the PIFS, if the first PPDU is normally transmitted, the moment for transmitting a next PPDU on the first link is earlier than a moment that is at an interval of PIFS after the first BA ends. Therefore, link recovery may be implemented earlier as compared with the conventional technology in which a failed PPDU is retransmitted at a moment that is at an interval of PIFS after the first BA ends, so that waiting time before the retransmission is reduced. In this case, there may be more time for transmitting new data, thereby increasing link throughput.

For error recovery of the second link, the transmitter MLD performs a process similar to that of the error recovery of the first link. In other words, the second station performs a method similar to that of the first station, to perform the error recovery of the second link. For details, refer to the foregoing related descriptions. Details are not described herein again.

This implementation is described below by using a specific example.

Figure 8:
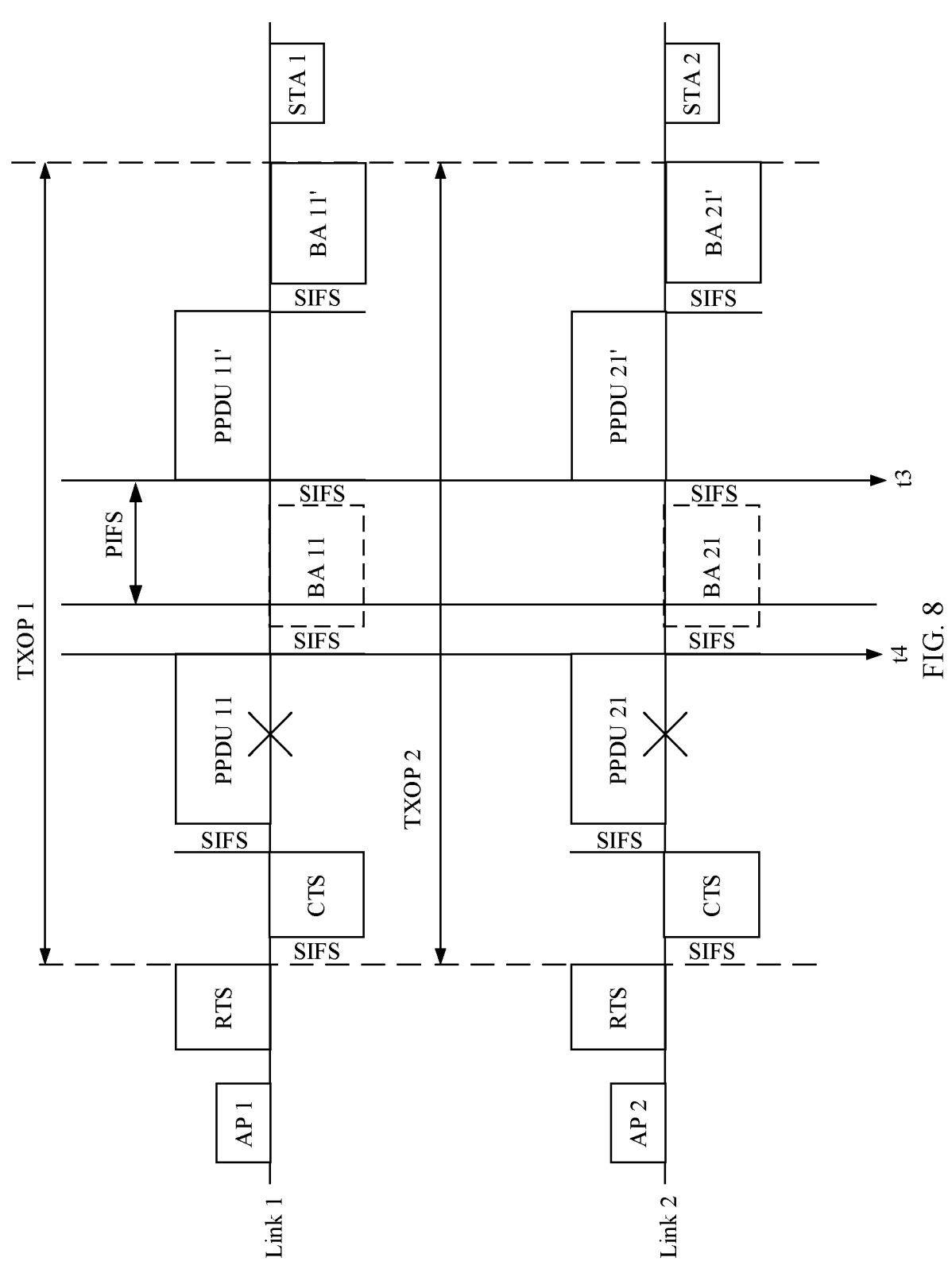

For example, based on the scenario shown in FIG. 5, an example in which the first link is the link 1, the second link is the link 2, the first PPDU is PPDU 11, the third PPDU is PPDU 21, the first BA is BA 11, and the BA of the PPDU 21 is BA 21 is used. As shown in FIG. 8, if the AP 1 does not receive the BA 11 after duration of SIFS from the end moment of the first PPDU, the AP transmitter MLD (or the AP 1) may determine that transmission of the PPDU 11 on the link 1 fails. Subsequently, if the AP transmitter MLD (or the AP 1) does not obtain the transmission status information of the second link at the moment t3, the AP transmitter MLD (or the AP 1) transmits a PPDU 11' at t3 by using the link 1, where the PPDU 11' may be understood as the second PPDU.

Similarly, if the AP 2 does not receive the BA 21 after duration of SIFS from the end moment of the third PPDU, the AP transmitter MLD (or the AP 2) may determine that transmission of the PPDU 21 on the link 2 fails. Subsequently, if the AP transmitter MLD (or the AP 2) does not obtain the transmission status information of the first link at the moment t3, the AP transmitter MLD (or the AP 2) transmits a PPDU 21' at t3 by using the link 2, where the PPDU 21' may be understood as the fourth PPDU.

In still another possible implementation, an interval between the first moment and the moment at which the transmitter MLD obtains the transmission status information of the second link is PIFS.

The first moment is later than the moment at which the transmitter MLD obtains the transmission status information of the second link. To be specific, after waiting for duration of PIFS from the moment at which the transmitter MLD obtains the transmission status information of the second link, the transmitter MLD transmits the second PPDU to the receiver MLD by using the first link.

Optionally, when an interval between the moment at which the transmitter MLD obtains the transmission status information of the second link and the end moment of the first PPDU is less than or equal to the PIFS, the transmitter MLD determines that an interval between the first moment and the moment at which the transmitter MLD obtains the transmission status information of the second link is PIFS.

For example, if the end moment of the first PPDU is represented by using t4, and the moment at which the transmitter MLD obtains the transmission status information of the second link is represented by using t2, it may be indicated that in a case of $t2-t4 \leq PIFS$, the transmitter MLD determines that the interval between the first moment and the moment at which the transmitter MLD obtains the transmission status information of the second link is PIFS.

For error recovery of the second link, the transmitter MLD performs a process similar to that of the error recovery of the first link. In other words, the second station performs a method similar to that of the first station, to perform the error recovery of the second link. For details, refer to the foregoing related descriptions. Details are not described herein again.

This implementation is described below by using a specific example.

Figure 9:
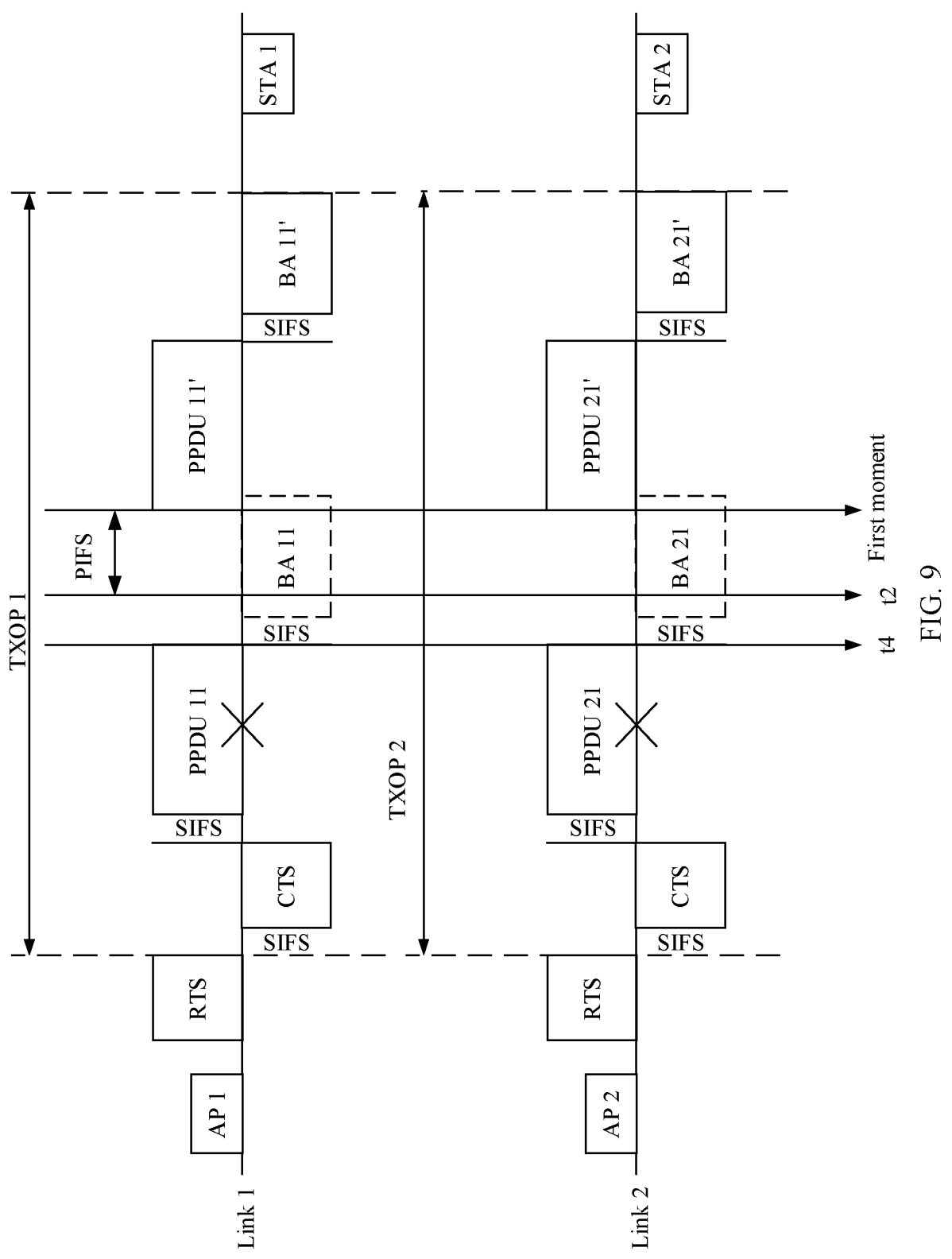

For example, based on the scenario shown in FIG. 5, an example in which the first link is link 1, the second link is link 2, the first PPDU is PPDU 11, the third PPDU is PPDU 21, the first BA is BA 11, and the BA of the PPDU 21 is BA 21 is used. As shown in FIG. 9, if the AP 1 does not receive the BA 11 after duration of SIFS from the end moment of the first PPDU, the AP transmitter MLD (or the AP 1) may determine that transmission of the PPDU 11 on the link 1 fails. Subsequently, the AP transmitter MLD (or the AP 1) uses t2 as a start moment of the first time period, and transmits a PPDU 11' at the end moment of the first time period by using the link 1, where the PPDU 11' may be understood as the second PPDU.

Similarly, if the AP 2 does not receive the BA 21 after duration of SIFS from the end moment of the third PPDU, the AP transmitter MLD (or the AP 2) may determine that transmission of the PPDU 21 on the link 2 fails. Subsequently, the AP transmitter MLD (or the AP 2) uses t2 as a start moment of the first time period, and transmits a PPDU 21' at the end moment of the first time period by using the link 2, where the PPDU 21' may be understood as the fourth PPDU.

Figure 10:
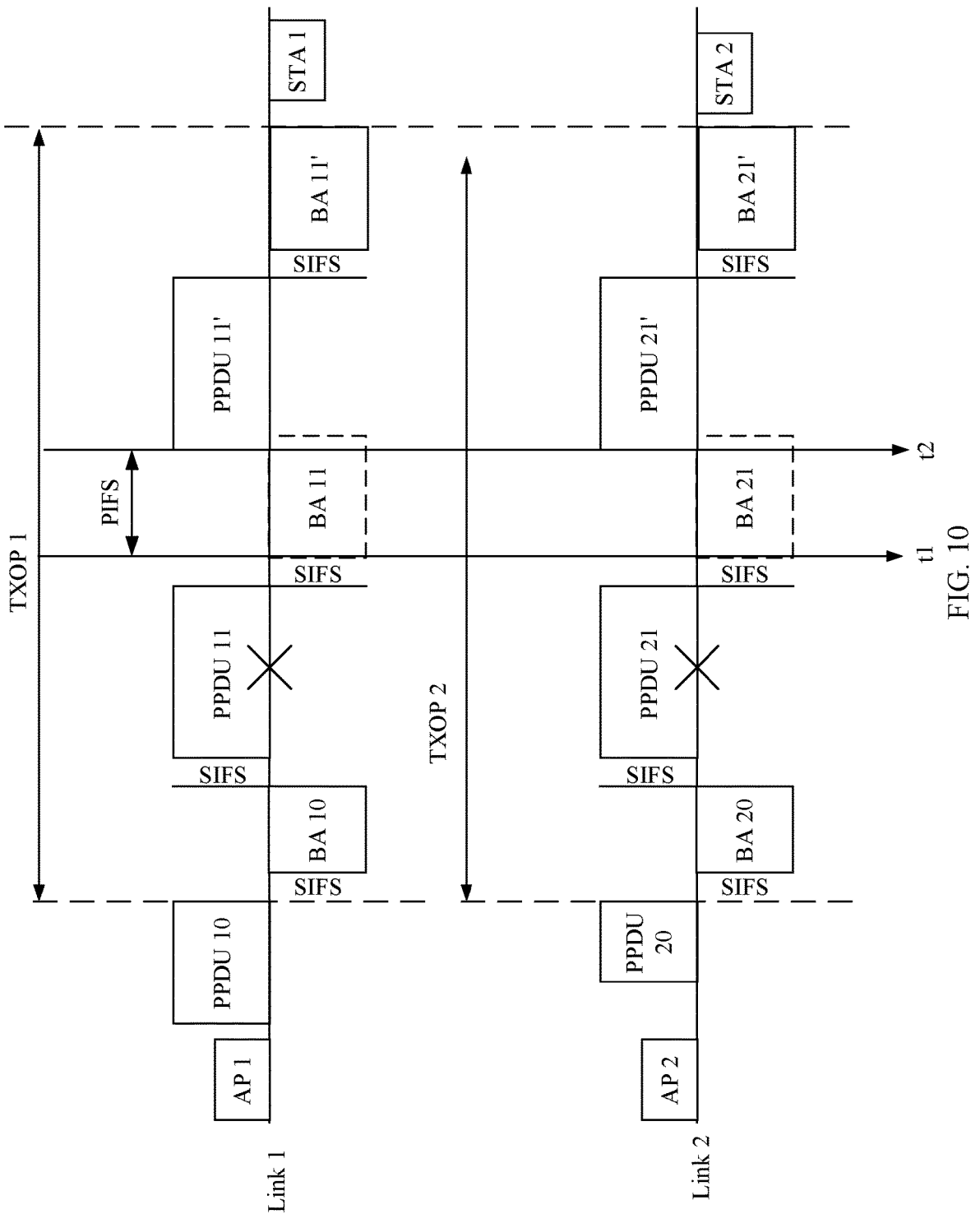

It should be noted that, in FIG. 7 to FIG. 9, RTSs/CTSs on the link 1 and the link 2 are completely aligned, which does not limit that the solution in this embodiment is only applicable to a case in which RTSs/CTSs on a plurality of links are completely aligned. This solution is also applicable to the case in which RTSs/CTSs on a plurality of links are not completely aligned. For example, the solution shown in FIG. 7 may also be applicable to the scenario shown in FIG. 10, where a PPDU 10 and a PPDU 20 include RTSs, and a BA 10 and a BA 20 include CTSs.

RTSs on different links are completely aligned, which may indicate that start moments and end moments of RTSs on different links are all the same. CTSs on different links are completely aligned, which may indicate that start moments and end moments of CTSs on different links are all the same.

Based on this solution, on one hand, in a scenario in which one of the transmitter MLD and the receiver MLD has the STR capability while the other does not have the STR capability, and transmission of the first PPDU on the first link fails, the transmitter MLD may transmit the second PPDU at the first moment to retransmit the error part in the first PPDU, thereby implementing error recovery of the first link. On the other hand, when the first moment is the moment at which the transmitter MLD obtains the transmission status information of the second link, a delay in internal transmission status information exchange of the transmitter MLD is considered. As compared with a case in which transmission status information exchange is assumed to be very fast, product implementation is further facilitated, and design pressure on the transmitter MLD is reduced. Alternatively, when the first moment is the moment for transmitting a next PPDU on the first link if the first PPDU is normally transmitted, link recovery can be implemented earlier as compared with a case in which the second PPDU is transmitted at a moment that is at an interval of PIFS from the end moment of the BA of the first PPDU, so that waiting time before the retransmission is reduced. In this case, there may be more time for transmitting new data, thereby increasing link throughput.

In the foregoing embodiment, an error recovery method in a scenario in which PPDU transmission failures occur on both the first link and the second link between the transmitter MLD and the receiver MLD is described. In addition, an embodiment of this application further provides a link error recovery method, and the method does not limit that PPDU transmission failures occur on both a first link and a second link.

The method may be performed by the transmitter MLD, or by a component (for example, a chip) that may be used in the transmitter MLD. In this application, description is made by using an example in which the method is performed by the transmitter MLD. In addition, in this method, one of the transmitter MLD and a receiver MLD has an STR capability while the other does not have the STR capability.

In the following embodiment of this application, an example in which the transmitter MLD is an AP MLD, and the receiver MLD is a non-STR STA MLD is used. It is assumed that the AP MLD includes two stations, AP 1 and AP 2, where the AP 1 supports a link 1, and AP 2 supports a link 2; and the non-STR STA MLD includes a STA 1 and a STA 2, where the STA 1 communicates with the AP 1 by using the link 1, and the STA 2 communicates with the AP 2 by using the link 2.

Figure 11:
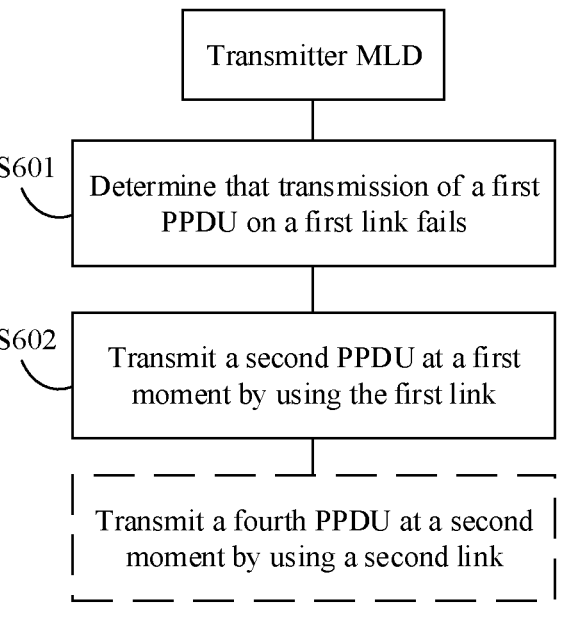
FIG. 11 is a schematic flowchart of another link error recovery method according to an embodiment of this application.

In a possible implementation scenario, as shown in FIG. 11, the method includes the following steps.

S1101. A transmitter MLD determines that transmission of a first PPDU on a first link fails.

For related descriptions in step S1101, refer to step S601, and details are not described herein again.

S1102. The transmitter MLD transmits a second PPDU to a receiver MLD at a first moment by using the first link. Correspondingly, the receiver MLD receives the second PPDU that is from the transmitter MLD by using the first link.

The second PPDU is used to retransmit an error part in the first PPDU. For related descriptions about transmitting the second PPDU by the transmitter MLD to the receiver MLD, refer to related descriptions in step S602, and details are not described herein again.

Optionally, after receiving the second PPDU, the receiver MLD may transmit a BA of the second PPDU to the transmitter MLD, or may perform service processing based on the second PPDU. This is not specifically limited in this embodiment of this application.

The first moment in this embodiment is described below. Optionally, in different implementation scenarios of this embodiment, the first moment may also be different.

In a possible implementation, when transmission of the first PPDU on the first link fails, and transmission of a BA of a third PPDU on the second link succeeds, the first moment is a predicted end moment of a first BA, where the first BA is a BA of the first PPDU. An end moment of the third PPDU is the same as that of the first PPDU.

Figure 12:
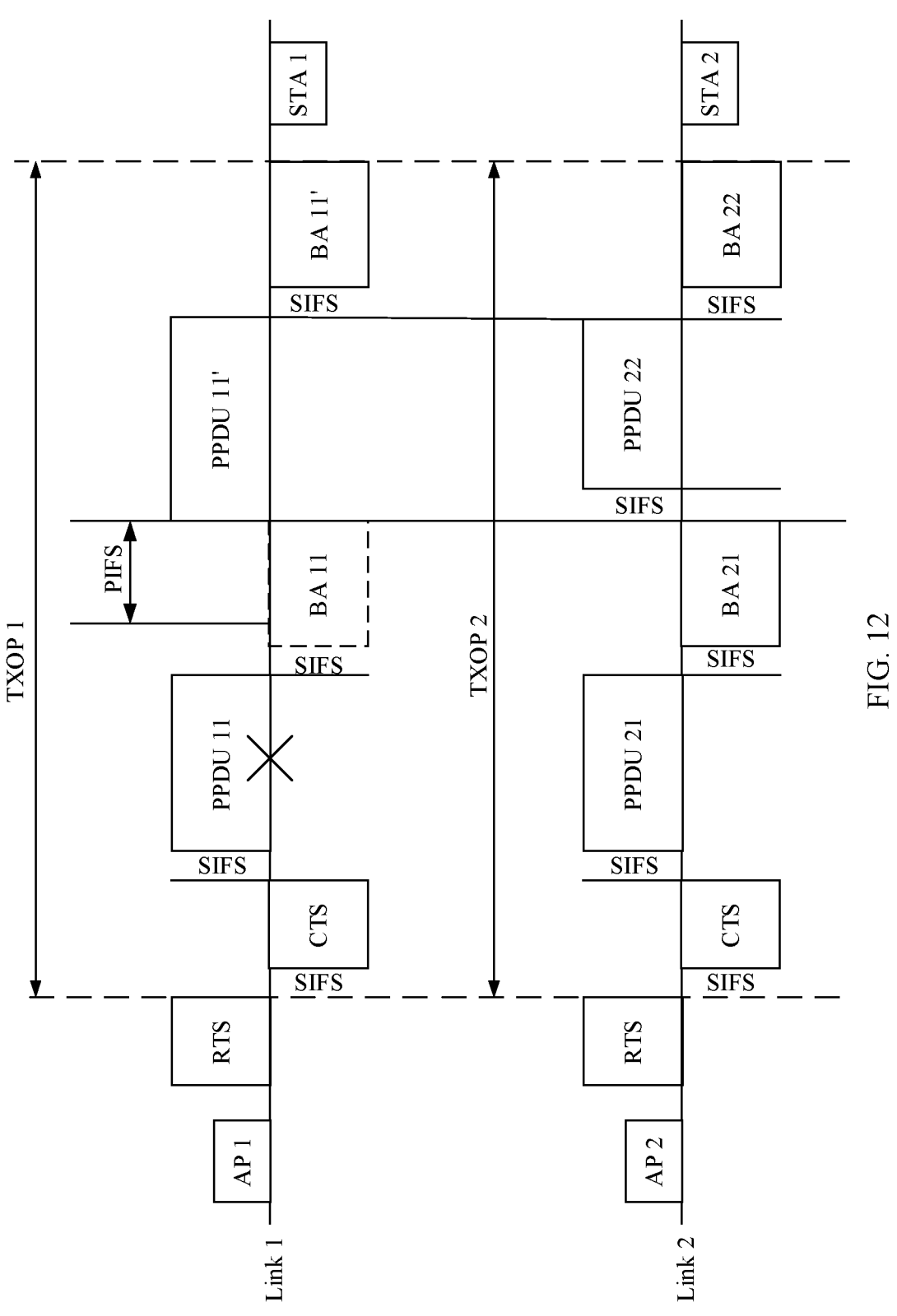
FIG. 12 to FIG. 15 are schematic diagrams of application of another link error recovery method according to an embodiment of this application.

For example, the first link is the link 1, the second link is the link 2, a PPDU transmission failure occurs on the link 1, no transmission failure occurs on the link 2, the first PPDU is a PPDU 11, and the first BA is a BA 11. As shown in FIG. 12, if the AP 1 does not receive the BA 11 after duration of SIFS from the end moment of the first PPDU, an AP transmitter MLD (or the AP 1) may determine that transmission of the PPDU 11 on the link 1 fails. Subsequently, the AP MLD (or the AP 1) transmits a PPDU 11' at the predicted end moment of the first BA by using the link 1, where PPDU 11' is the second PPDU. A PPDU 21 is the third PPDU on the link 2, and a PPDU 22 is a fourth PPDU on the link 2.

In another implementation, when transmission of the first PPDU on the first link fails, and transmission of a BA of a third PPDU on the second link succeeds, the first moment is later than a predicted end moment of a first BA, where the first BA is a BA of the first PPDU. An end moment of the third PPDU is the same as that of the first PPDU.

Using FIG. 12 as an example, the first moment for transmitting the PPDU 11' on the first link, that is, time for transmitting the PPDU 11' is not earlier than the predicted end moment of the first BA.

Optionally, an interval between the first moment and the predicted end moment of the first BA is given duration. For example, the interval between the time for transmitting the PPDU 11' on the first link and the predicted end moment of the first BA may be a frame alignment error, for example, may be 8 μs.

Optionally, the first moment is the same as or is aligned with actual end time of the BA 2 on the second link. For example, the time for transmitting the PPDU 11' on the first link may be the actual end time of the BA 2 on the second link. A BA 21 is a BA of the PPDU 21 on the second link, and a PPDU 21 is the third PPDU on the second link.

It should be noted that in this possible implementation, the transmitter MLD has the STR capability, that is, is an STR MLD; and the receiver MLD does not have the STR MLD capability, that is, is a non-STR MLD.

In another possible implementation, when transmission of the first PPDU on the first link fails, and transmission of a BA of a third PPDU on the second link fails, the first moment is a predicted end moment of a first BA, where the first BA is a BA of the first PPDU. An end moment of the third PPDU is the same as that of the first PPDU.

Optionally, a BA transmission failure may include a BA decoding failure.

In this possible implementation, the link error recovery method provided in this embodiment may further include: the transmitter MLD transmits a fourth PPDU to the receiver MLD at a second moment by using the second link, where the fourth PPDU is used to retransmit a PPDU of an error part in the third PPDU.

An interval between the second moment and an end moment of the BA of the third PPDU is PIFS, and the second moment is later than the end moment of the BA of the third PPDU.

Optionally, an end moment of the fourth PPDU is the same as that of the second PPDU.

Figure 13:
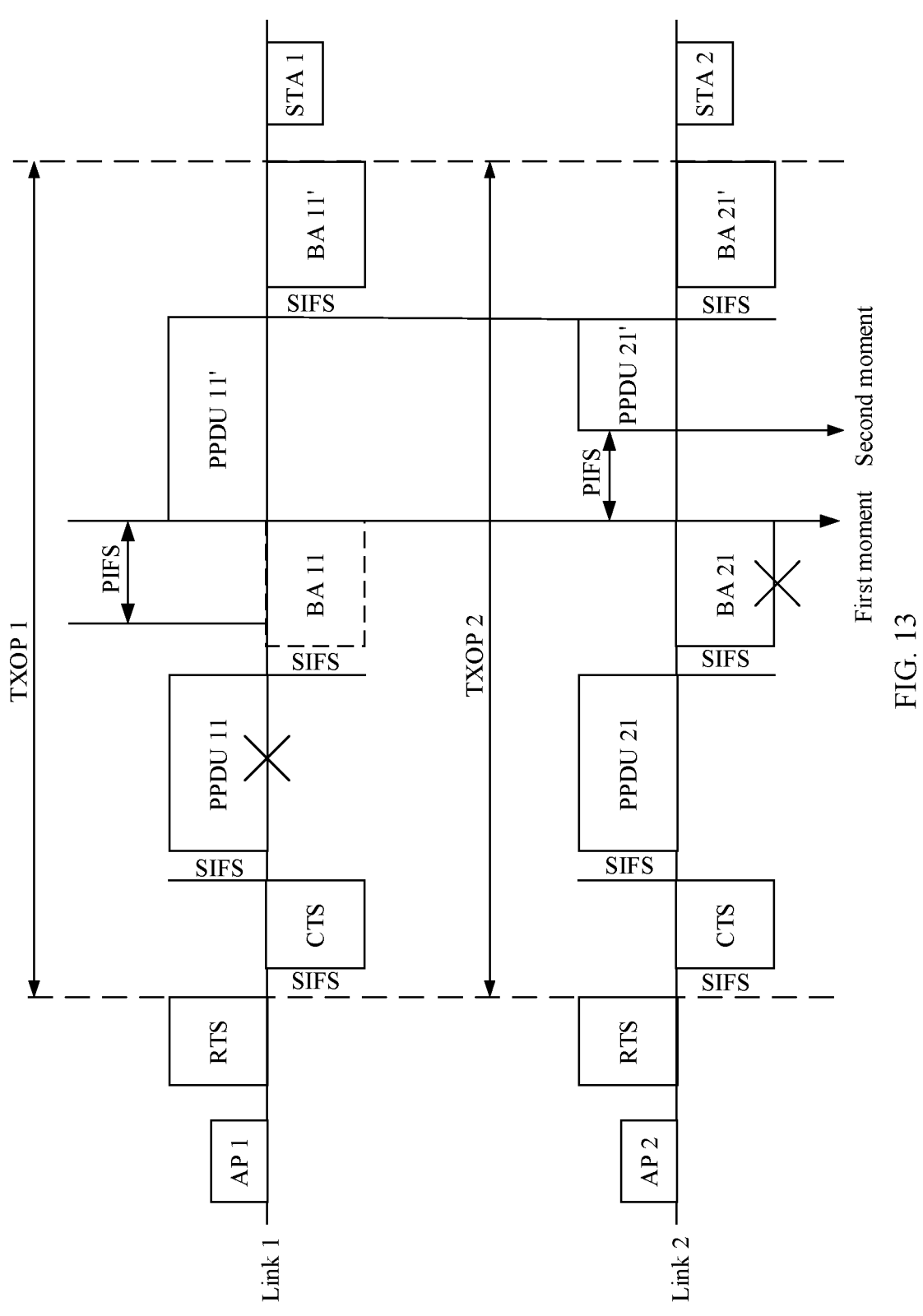

For example, the first link is the link 1, the second link is the link 2, a PPDU transmission failure occurs on the link 1, a BA transmission failure occurs on the link 2, the first PPDU is a PPDU 11, the first BA is a BA 11, the third PPDU is a PPDU 21, and the BA of the third PPDU is a BA 21. As shown in FIG. 13, if transmission of the BA 21 fails, the AP MLD (or the AP 2) may transmit a PPDU 21' after waiting for duration of PIFS from the end moment of the BA 21, where the PPDU 21' is the fourth PPDU.

It should be noted that in this possible implementation, the transmitter MLD has the STR capability, that is, is an STR MLD; and the receiver MLD does not have the STR MLD capability, that is, is a non-STR MLD.

Based on the foregoing two possible implementations, by transmitting the second PPDU at the predicted end moment of the first BA, link recovery may be implemented earlier as compared with a case in which the second PPDU is transmitted at a moment that is at an interval of PIFS from an end moment of the first BA, so that waiting time before retransmission is reduced. In this case, there may be more time for transmitting new data, thereby increasing link throughput.

In still another possible implementation, when transmission of the first PPDU on the first link fails, and transmission of a BA of a third PPDU on the second link fails, an interval between the first moment and a predicted end moment of a first BA is PIFS, and the first moment is later than an end moment of the first BA.

In this possible implementation, the link error recovery method provided in this embodiment may further include: the transmitter MLD transmits a fourth PPDU to the receiver MLD at a second moment by using the second link, where the fourth PPDU is used to retransmit a PPDU of an error part in the third PPDU. For the second moment, refer to related descriptions above.

Figure 14:
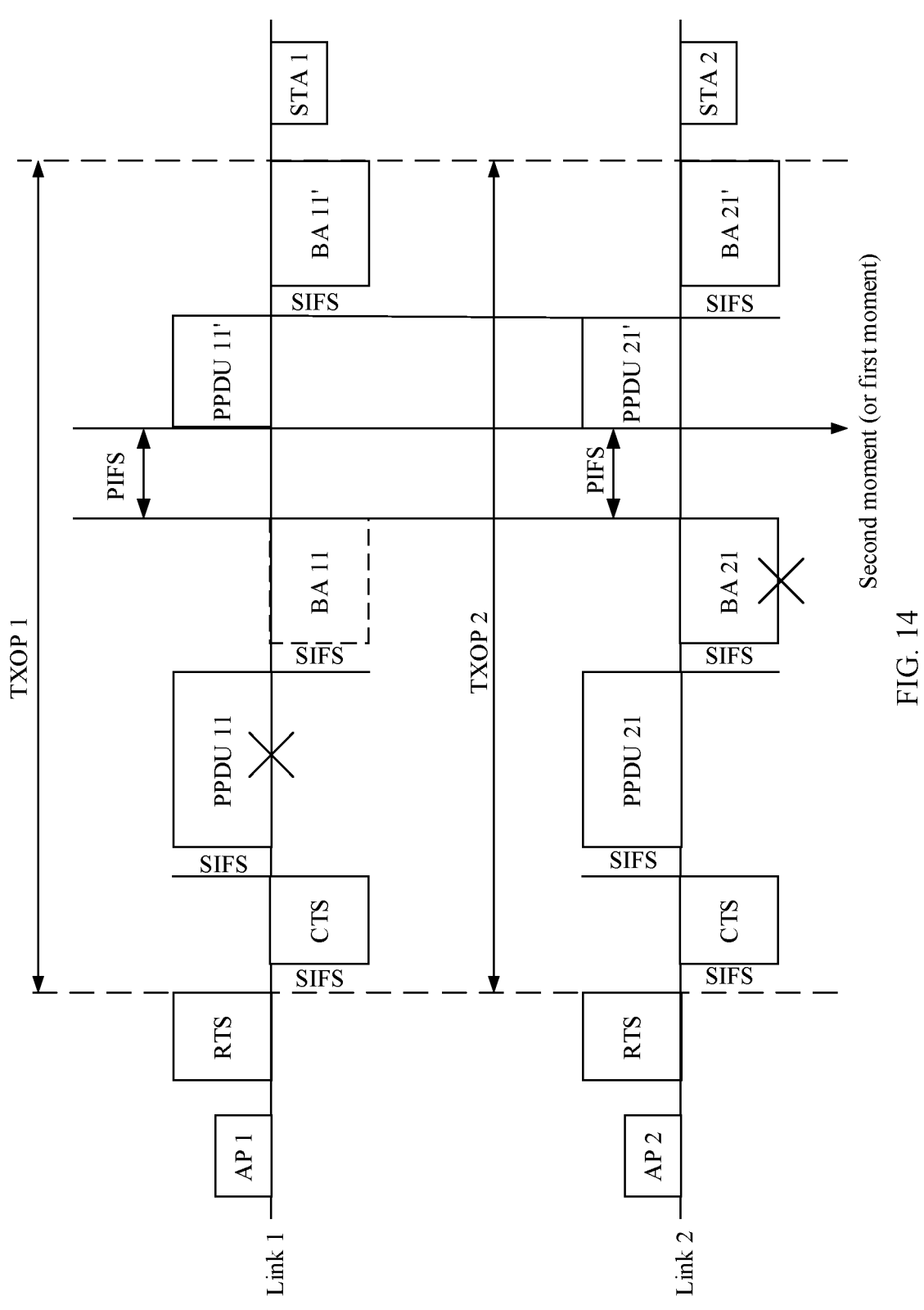

For example, the first link is the link 1, the second link is the link 2, a PPDU transmission failure occurs on the link 1, a BA transmission failure occurs on the link 2, the first PPDU is a PPDU 11, the first BA is a BA 11, the third PPDU is a PPDU 21, and the BA of the third PPDU is a BA 21. As shown in FIG. 14, when transmission of the PPDU 11 fails, the AP MLD (or the AP 1) transmits a PPDU 11' at the first moment, where the PPDU 11' is the second PPDU. When transmission of the BA 21 fails, the AP MLD (or the AP 2) transmits a PPDU 21' at the second moment, where the PPDU 21' is the fourth PPDU.

It should be noted that in this possible implementation, the transmitter MLD does not have the STR capability, that is, is a non-STR MLD; and the receiver MLD has the STR MLD capability, that is, is an STR MLD.

In yet another possible implementation, when transmission of the first PPDU on the first link fails, and transmission of a BA of a third PPDU on the second link fails, the first moment may be a moment at which the transmitter MLD obtains transmission status information of the second link, where the transmission status information of the second link may be used to indicate that transmission of the BA of the third PPDU fails.

Optionally, the first moment is earlier than a predicted end moment of a first BA.

In this possible implementation, the link error recovery method provided in this embodiment may further include: the transmitter MLD transmits a fourth PPDU to the receiver MLD at a second moment by using the second link, where the fourth PPDU is used to retransmit a PPDU of an error part in the third PPDU. For the second moment, refer to related descriptions above.

Figure 15:
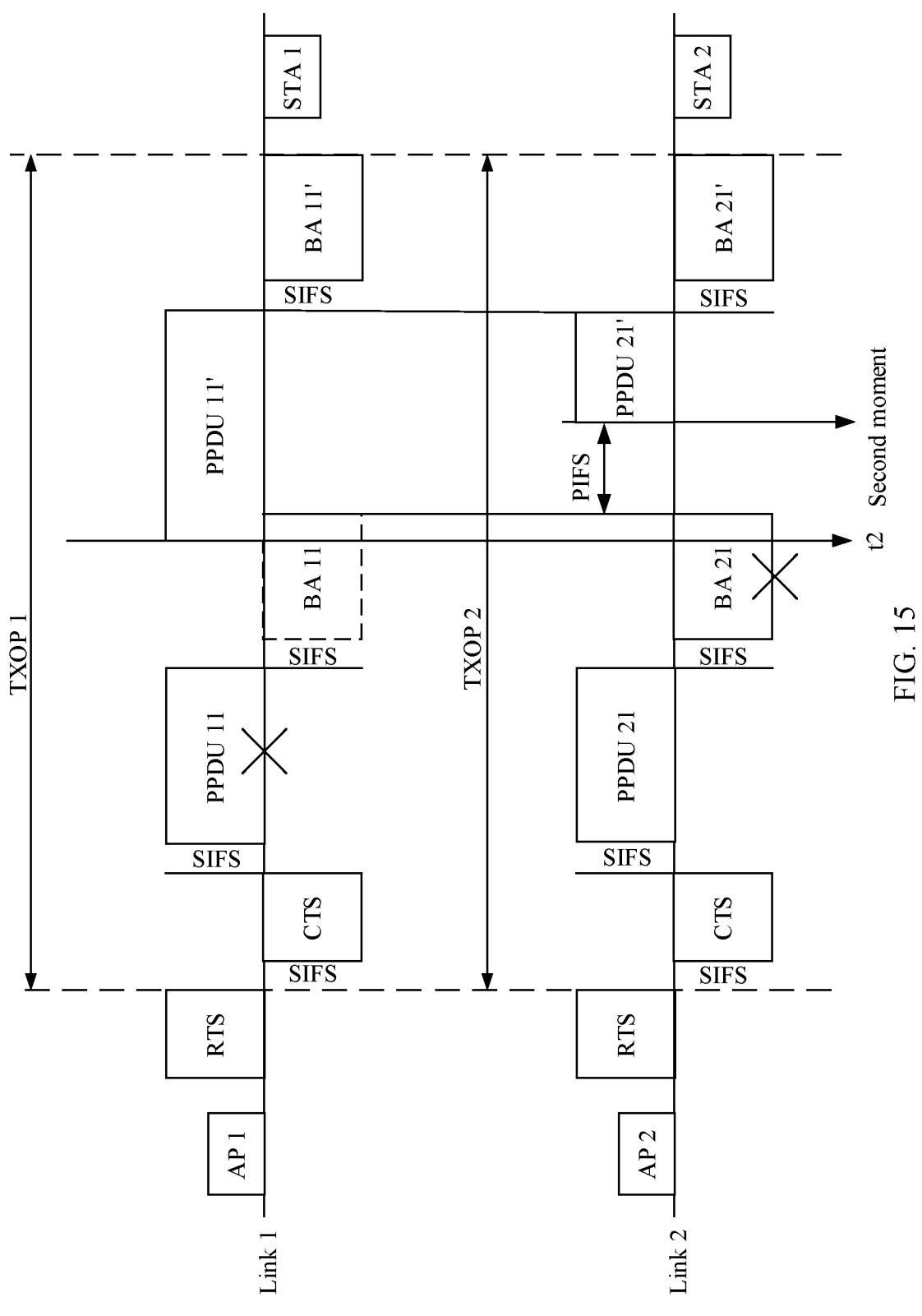

For example, the first link is the link 1, the second link is the link 2, a PPDU transmission failure occurs on the link 1, a BA transmission failure occurs on the link 2, the first PPDU is a PPDU 11, the first BA is a BA 11, the third PPDU is a PPDU 21, the BA of the third PPDU is a BA 21, and the moment at which the transmitter MLD obtains the transmission status information of the second link is t2. As shown in FIG. 15, when transmission of the PPDU 11 fails, the AP MLD (or the AP 1) transmits a PPDU 11' at t2, where the PPDU 11' is the second PPDU. When transmission of the BA 21 fails, the AP MLD (or the AP 2) transmits a PPDU 21' at a moment that is at an interval of PIFS from the BA 21, where the PPDU 21' is the fourth PPDU.

It should be noted that in this possible implementation, the transmitter MLD has the STR capability, that is, is an STR MLD; and the receiver MLD does not have the STR MLD capability, that is, is a non-STR MLD.

Based on this possible implementation, link recovery may be implemented earlier as compared with a case in which second PPDU is transmitted at a moment that is at an interval of PIFS from the end moment of the first BA, so that waiting time before retransmission is reduced. In this case, there may be more time for transmitting new data, thereby increasing link throughput.

It may be understood that, in the foregoing four possible implementations, because the receiver MLD is a non-STR MLD, the end moment of the second PPDU is the same as that of the fourth PPDU on the second link.

Optionally, for an implementation in which the end moment of the fourth PPDU is the same as that of the second PPDU, regarding the fourth PPDU and the second PPDU, the PPDU that is transmitted later may adjust the PPDU length thereof based on the length of the PPDU that is transmitted earlier. For example, the length is adjusted by aggregating fewer media access control protocol data units (MPDUs) or by reducing padding.

Optionally, in the foregoing four possible implementations, if the first link is not idle during a first time period in which the first moment is the end moment, or CCA is not passed during the first time period, channel backoff may be started at the predicted end moment of the first BA. After the channel backoff ends, the transmitter MLD transmits the second PPDU to the receiver MLD by using the first link. Based on this solution, backoff recovery may be continued when PIFS recovery fails, thereby improving reliability of link error recovery.

Based on the solution shown in FIG. 11, on one hand, in a scenario in which the transmitter MLD has the STR capability while the receiver MLD does not have the STR capability, and transmission of the first PPDU on the first link fails, the transmitter MLD may transmit the second PPDU at the first moment, to retransmit the error part in the first PPDU, thereby implementing error recovery of the first link. On the other hand, when transmission of the BA of the third PPDU on the second link fails, the fourth PPDU may be transmitted at the second moment, to retransmit the error part in the third PPDU, thereby implementing error recovery of the second link.

Figure 16:
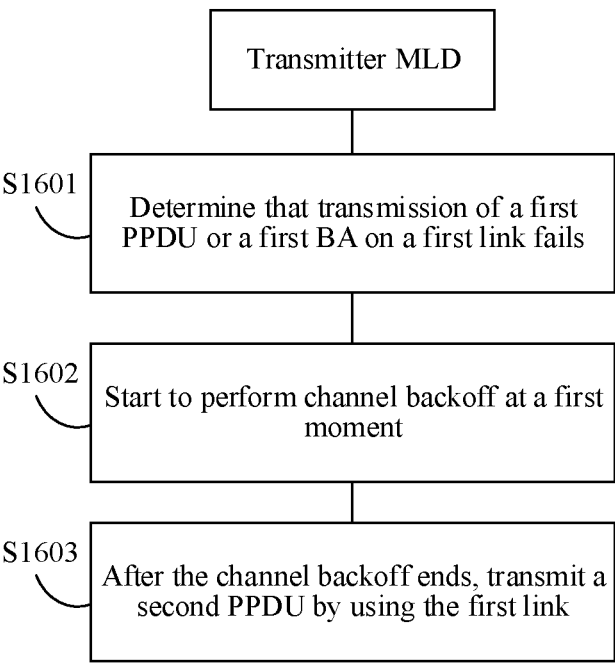
FIG. 16 is a schematic flowchart of still another link error recovery method according to an embodiment of this application.

In another possible implementation scenario, as shown in FIG. 16, the method includes the following steps.

S1601. A transmitter MLD determines that transmission of a first PPDU or a first BA on a first link fails.

The first BA is a BA of the first PPDU. For a transmission failure of the first PPDU or the first BA, refer to the related descriptions above, and details are not described herein again.

S1602. The transmitter MLD starts to perform channel backoff at a first moment.

The first moment is an end moment of the first BA. It may be understood that the channel backoff is channel backoff on the first link.

S1603. After the channel backoff ends, the transmitter MLD transmits a second PPDU to a receiver MLD by using the first link. Correspondingly, the receiver MLD receives the second PPDU that is from the transmitter MLD by using the first link.

The second PPDU is used to retransmit an error part in the first PPDU.

It may be understood that, in step S1603, the transmitter MLD does not perform CCA before transmitting the second PPDU.

Figure 17:
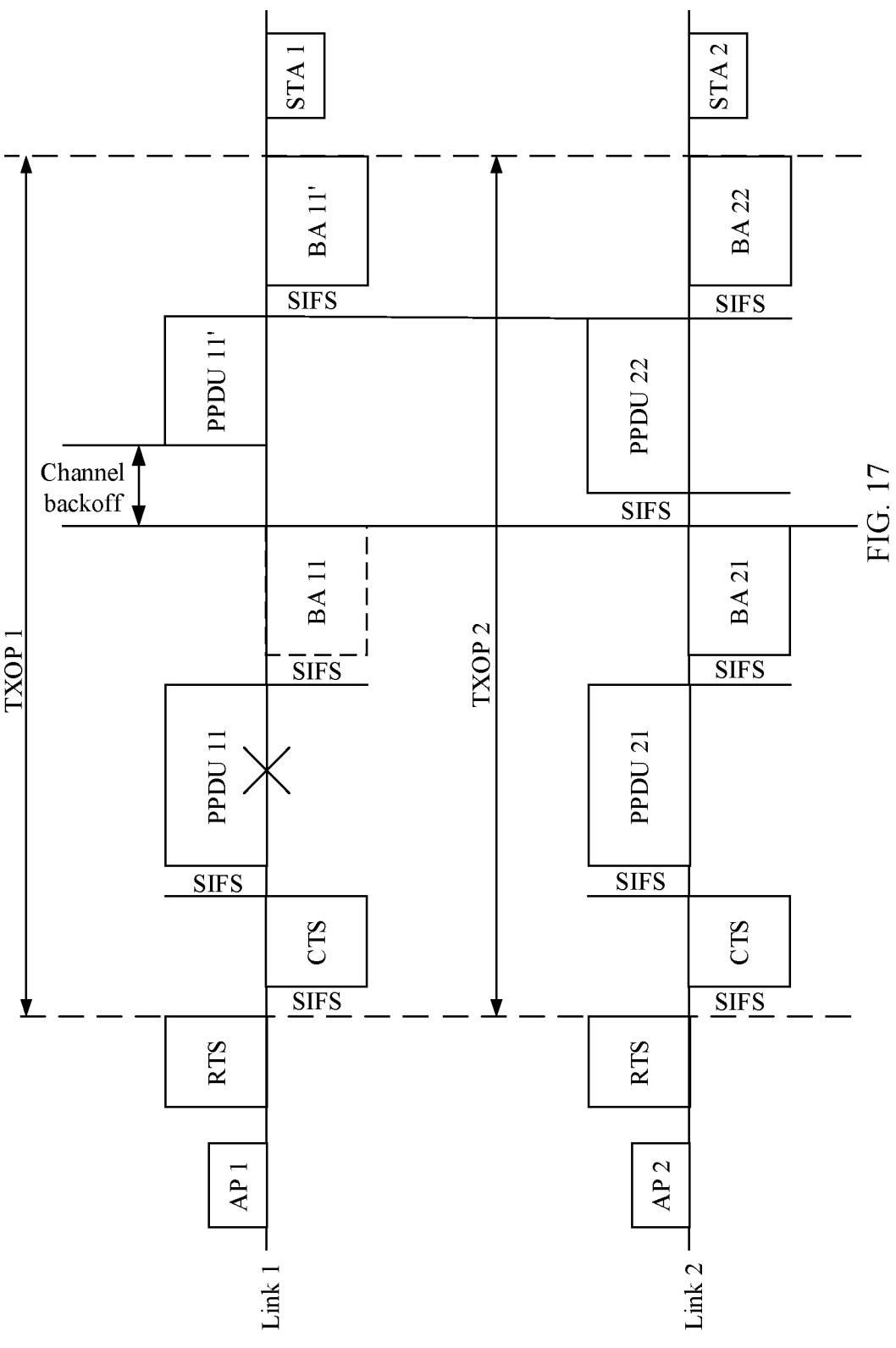
FIG. 17 is a schematic diagram of application of still another link error recovery method according to an embodiment of this application.

For example, the first link is the link 1, the second link is the link 2, a PPDU transmission failure occurs on the link 1, no transmission failure occurs on the link 2, the first PPDU is a PPDU 11, and the first BA is a BA 11. As shown in FIG. 17, at a predicted end moment of the BA 11, the AP MLD (or the AP 1) starts to perform channel backoff, and transmits a PPDU 11' after the backoff ends, where the PPDU 11' is the second PPDU.

Optionally, when transmission of a BA of a third PPDU on the second link fails, the transmitter MLD may also perform channel backoff on the second link at an end moment of the BA; and after the channel backoff ends, transmit a fourth PPDU to the receiver MLD on the second link, to retransmit an error part in the third PPDU.

Optionally, after receiving the second PPDU, the receiver MLD may transmit a BA of the second PPDU to the transmitter MLD, or may perform service processing based on the second PPDU. This is not specifically limited in this embodiment of this application.

Based on this solution, on one hand, in a scenario in which the transmitter MLD has the STR capability while the receiver MLD does not have the STR capability, and transmission of the first PPDU on the first link fails, the transmitter MLD may start to perform channel backoff at the predicted end moment of the BA of the first PPDU, and transmit the second PPDU on the first link after the channel backoff ends, to retransmit the error part in the first PPDU, thereby implementing error recovery of the first link. On the other hand, when transmission of the BA of the third PPDU on the second link fails, channel backoff on the second link may be started at an end moment of the BA, and the fourth PPDU is transmitted after the channel backoff ends, to retransmit the error part in the third PPDU, thereby implementing error recovery of the second link.

In addition, an embodiment of this application further provides a link error recovery method. The method may be performed by a transmitter MLD, or by a component (for example, a chip) that may be used in the transmitter MLD. In this application, description is made by using an example in which the method is performed by the transmitter MLD. In this method, one of the transmitter MLD and a receiver MLD has an STR capability while the other does not have the STR capability. In other words, one of the transmitter MLD and the receiver MLD is an STR MLD, and the other is a non-STR MLD.

Figure 18:
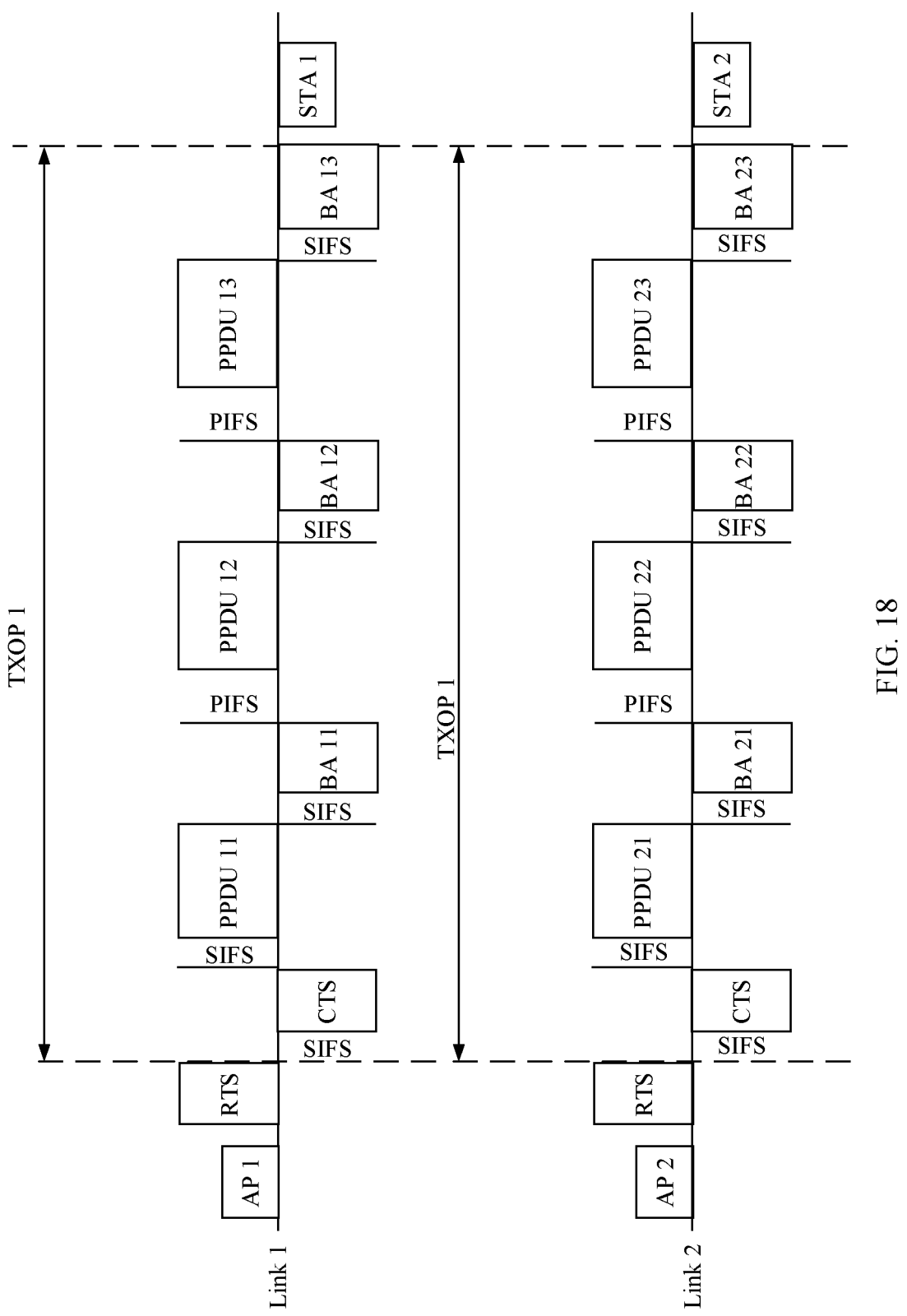
FIG. 18 is a schematic diagram of interframe space according to an embodiment of this application.

In this method, after a TXOP is successfully established on each link of the transmitter MLD, interframe space after a BA in the TXOP is PIFS, and interframe space after a PPDU is still SIFS. For example, as shown in FIG. 18, interframe space after a BA 11 and a BA 12 is SIFS, and interframe space after a PPDU 11 and a PPDU 12 is PIFS.

It may be understood that the BA in this application is a type of response frame. Therefore, the interframe space after the BA in the TXOP is PIFS, which may be understood as that the interframe space after the response frame is PIFS. Correspondingly, in this embodiment of this application, receiving the BA may also be understood as receiving the response frame.

Figure 19:
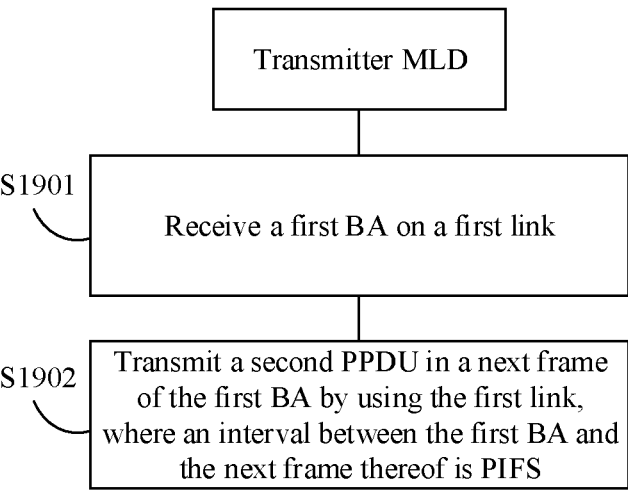
FIG. 19 is a schematic flowchart of yet another link error recovery method according to an embodiment of this application.

FIG. 19 is a schematic flowchart of the method. The link error recovery method may include the following steps.

S1901. A transmitter MLD receives a first BA on a first link.

The first BA is a BA of a first PPDU.

Optionally, if decoding fails after the BA of the first PPDU is received by the transmitter MLD, it may be considered as that transmission of the BA of the first PPDU fails.

S1902. The transmitter MLD transmits a second PPDU to a receiver MLD by using the first link. Correspondingly, the receiver MLD receives the second PPDU that is from the transmitter MLD by using the first link.

An interval between a start moment of the second PPDU and an end moment of the first BA is interframe space, and the interframe space is a PIFS. For related descriptions about transmitting the second PPDU by the transmitter MLD to the receiver MLD, refer to related descriptions in step S602, and details are not described herein again.

Optionally, when decoding of the first BA fails, the second PPDU is used to retransmit an error part in the first PPDU.

Figure 20:
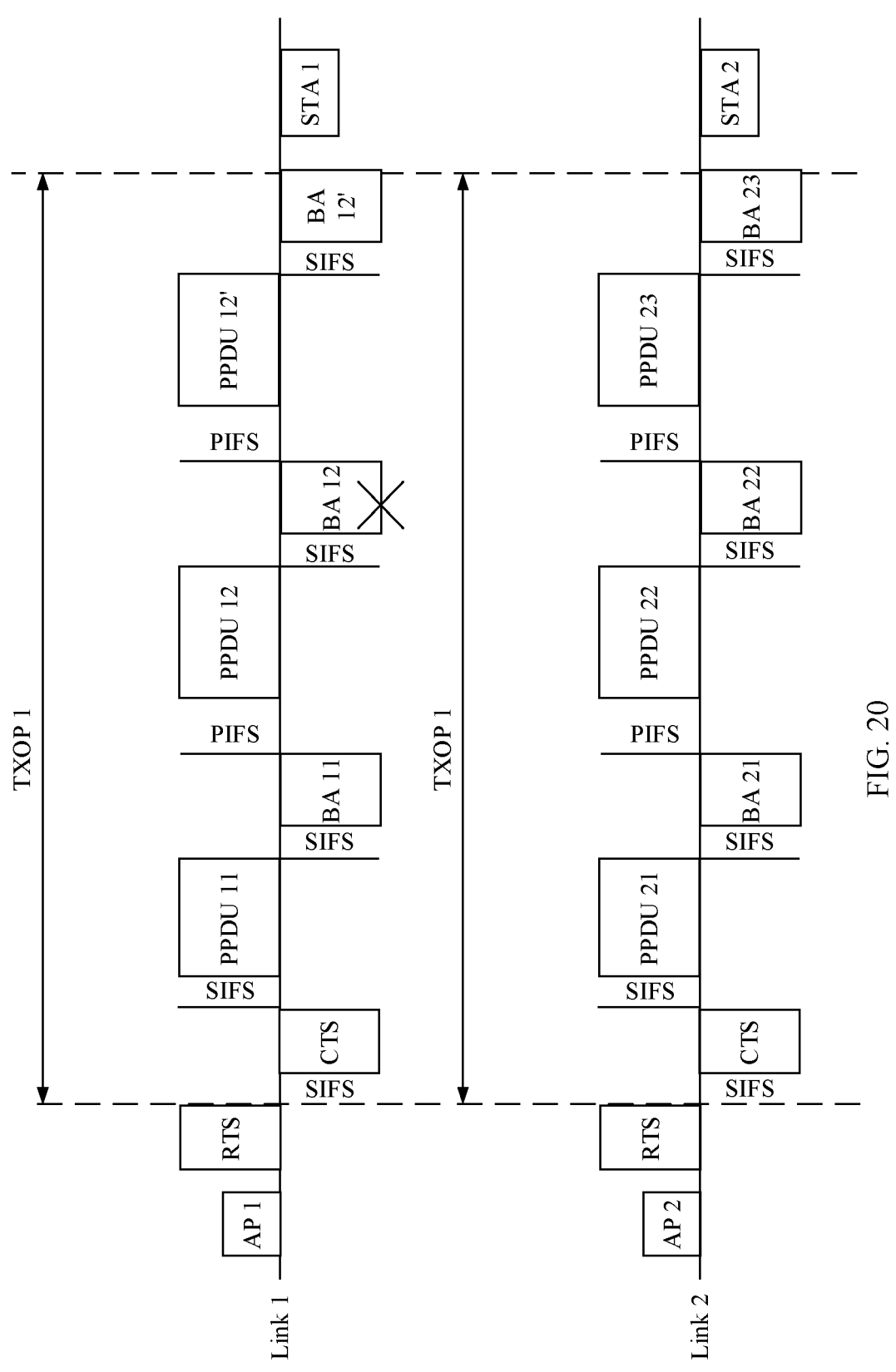
FIG. 20 and FIG. 21 are schematic diagrams of application of yet another link error recovery method according to an embodiment of this application.

For example, the first link is a link 1, a second link is a link 2, the first PPDU on the link 1 is a PPDU 12, and decoding of a BA (BA 12) of the PPDU 12 fails. As shown in FIG. 20, after decoding of the BA 12 fails, the transmitter MLD transmits a PPDU 12' in a next frame of the BA 12. Interframe space between the BA 12 and the PPDU 12' is PIFS, and the PPDU 12' is the second PPDU.

In addition, when transmission of the first PPDU on the first link fails, the transmitter MLD may still transmit the second PPDU to a receiver in a next frame of the first BA by using the first link, to retransmit the error part in the first PPDU.

Figure 21:
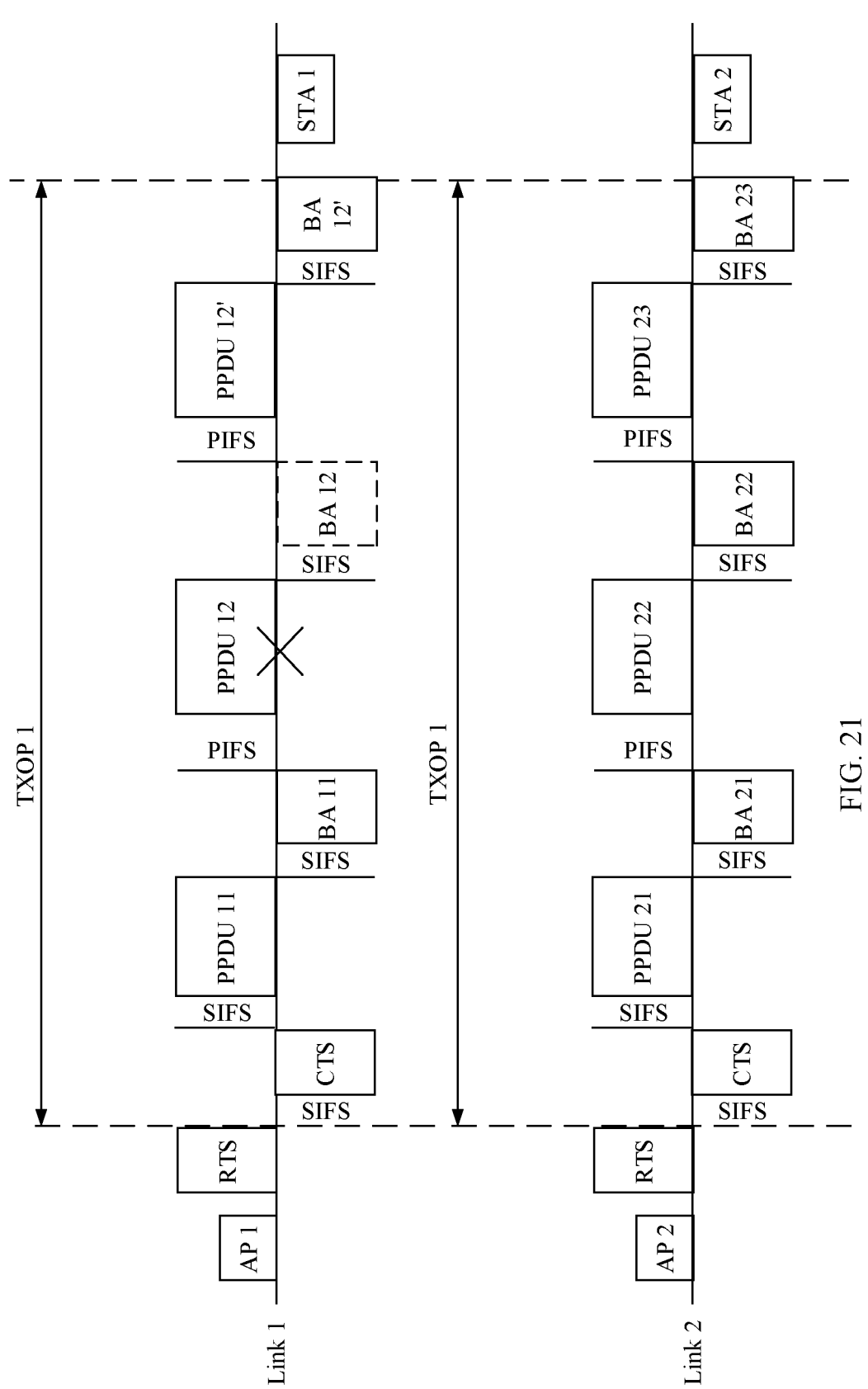

For example, the first link is a link 1, a second link is a link 2, the first PPDU on the link 1 is a PPDU 12, and transmission of the PPDU 12 fails. As shown in FIG. 21, after transmission of the PPDU 12 fails, the transmitter MLD transmits a PPDU 12' in a next frame of the BA 12. Interframe space between the BA 12 and the PPDU 12' is PIFS, and the PPDU 12' is the second PPDU.

Optionally, after receiving the second PPDU, the receiver MLD may transmit a BA of the second PPDU to the transmitter MLD, or may perform service processing based on the second PPDU. This is not specifically limited in this embodiment of this application.

Based on this solution, when the interframe space after the BA is PIFS, on one hand, even if transmission of a PPDU or a BA on a link fails, transmission status information on another link is not obtained when the transmitter MLD performs error recovery on this link. In this case, internal information exchange of the transmitter MLD is avoided, and power consumption of the transmitter MLD is reduced. On the other hand, because interframe space after a BA on each link is PIFS, and interframe space after a PPDU is SIFS, synchronous transmission may be implemented even if the transmission status information on another link is not obtained during error recovery of a link. For example, in the example shown in FIG. 20 or FIG. 21, a transmission failure occurs on the link 1, but no transmission failure occurs on the link 2. When the method is used to perform error recovery on the link 1, synchronous transmission with the link 2 may be performed. In this way, a case in which the non-STR MLD needs to simultaneously transmit and receive data is avoided.

The link error recovery method provided in this application is described above. Link error recovery in various scenarios is summarized below.

It should be noted that, this summary is described in a case in which the transmitter MLD is an STR MLD or a non-STR MLD, and links between the transmitter MLD and the receiver MLD include a link 1 and a link 2. The link 1 and the link 2 are merely examples for distinguishing between the links, and link statuses of the link 1 and the link 2 may be interchanged. When the link statuses are interchanged, the same method may still be used to perform error recovery on the error link.

For explanations of the following link statuses involved in the summary, refer to Table 1.

TABLE 1

| Link status | Interpretation |
|---|---|
| Success | A PPDU and a BA are successfully transmitted and received. |
| PPDU error | Transmission of the PPDU fails. |
| BA error | Transmission of the BA fails. |

When the transmitter is an STR MLD, transmission schemes or error recovery schemes in various scenarios are shown in Table 2.

TABLE 2

| Scenario | Status of link 1 | Status of link 2 | Transmission scheme (or error recovery scheme) | Remarks |
|---|---|---|---|---|
| Case 1 | Success | Success | Interframe space after a BA is SIFS. | |
| Case 2 | PPDU error | Success | Link 1: Time for transmitting a next PPDU is not earlier than an end time of a BA on the link 2.<br>Link 2: Normal transmission. Interframe space after a BA is SIFS. | See the scheme shown in FIG. 12 of this application. |
| Case 3 | Success | BA error | Link 1: Normal transmission. Interframe space after a BA is SIFS.<br>Link 2: PIFS or TBD recovery is started at end time of an error BA, and start time of a next PPDU is not aligned with start time of a PPDU on the link 1. | See IEEE 802.11-20/0427r1 Synchronous multi-link operation (NXP). |
| Case 4 | PPDU error | PPDU error | Link 1: A next PPDU is transmitted when transmission status information of the other link is obtained or at a moment that is at an interval of SIFS from a predicted end moment of a BA.<br>Link 2: Same as the link 1. | See the schemes shown in FIG. 6 to FIG. 9 of this application. |
| Case 5 | PPDU error | BA error | Link 1: A next PPDU is transmitted at a predicted end moment of a BA or at a moment when transmission status information of the link 2 is obtained.<br>Link 2: A next PPDU is transmitted at a moment that is at an interval of PIFS from an end moment of a BA. | See the schemes shown in FIG. 13 or FIG. 15 of this application. |

When the transmitter is a non-STR MLD, transmission schemes or error recovery schemes in various scenarios are shown in Table 3.

TABLE 3

| Scenario | Status of link 1 | Status of link 2 | Transmission scheme (or error recovery scheme) | Remarks |
|---|---|---|---|---|
| Case 1 | Success | Success | Interframe space after a BA is PIFS.<br>Note: This scheme is not limited to a scenario in which the transmitter is a non- | See the scheme shown in |

TABLE 3-continued

| Scenario | Status of link 1 | Status of link 2 | Transmission scheme (or error recovery scheme) | Remarks |
|---|---|---|---|---|
| | | | STR MLD. | FIG. 18 of this application. |
| Case 2 | Success | PPDU error | Link 1: Normal transmission. Interframe space after a BA is SIFS.<br>Link 2: A next PPDU is transmitted at a moment that is at an interval of SIFS from an end moment of a BA on the link 1. | See IEEE 802.11-20/0427r1 Synchronous multi-link operation (NXP). |
| Case 3 | PPDU error | PPDU error | Link 1: A next PPDU is transmitted when transmission status information of the other link is obtained or at a moment that is at an interval of SIFS from a predicted end moment of a BA.<br>Link 2: Same as the link 1. | See the schemes shown in FIG. 6 to FIG. 9 of this application. |
| Case 4 | PPDU error | BA error | Link 1: A next PPDU is transmitted at a moment that is at an interval of PIFS from a predicted end moment of a BA.<br>Link 2: A next PPDU is transmitted at a moment that is at an interval of PIFS from an end moment of a BA. | See the scheme shown in FIG. 14 of this application. |

It may be understood that, in the foregoing embodiments, the methods and/or steps implemented by the transmitter MLD may also be implemented by a component (for example, a chip or a circuit) that may be used in the transmitter MLD.

The foregoing mainly describes the solutions provided in the embodiments of this application. Correspondingly, an embodiment of this application further provides a communication apparatus, and the communication apparatus is configured to implement the foregoing methods. The communication apparatus may be the transmitter MLD in the foregoing method embodiments, or may be an apparatus including the transmitter MLD, or may be an apparatus, for example, a system chip, included in the transmitter MLD.

It may be understood that, to implement the foregoing functions, the communication apparatus includes corresponding hardware structures and/or software modules for performing the functions. A person skilled in the art should be easily aware that units and algorithm steps in the examples described with reference to the embodiments disclosed in this specification can be implemented in a form of hardware or a combination of hardware and computer software in this application. Whether a function is implemented by hardware or hardware driven by computer software depends on particular applications and design constraints of the technical solutions. A person skilled in the art may use different methods to implement the described functions for each particular application, but it should not be considered that the implementation goes beyond the scope of this application.

In the embodiments of this application, the communication apparatus may be divided into functional modules based on the foregoing method embodiments. For example, each functional module may be obtained through division based on each corresponding function, or two or more functions may be integrated into one processing module. The integrated module may be implemented in a form of hardware, or may be implemented in a form of a software functional module. It should be noted that division into the modules is an example and is merely logical function division in the embodiments of this application. In actual implementation, another division manner may be used.

Figure 22:
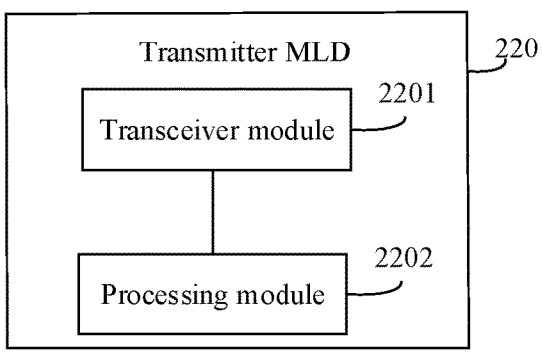
FIG. 22 is a schematic diagram of a structure of a transmitter MLD according to an embodiment of this application.

For example, an example in which the communication apparatus is the transmitter MLD in the foregoing method embodiments is used. FIG. 22 is a schematic diagram of a structure of a transmitter MLD 220. The transmitter MLD 220 includes a transceiver module 2201 and a processing module 2202. The transceiver module 2201, may also be referred to as a transceiver unit, is configured to implement a transmitting and/or receiving function. For example, the transceiver module 2201 may be a transceiver circuit, a transceiver, a transceiver, or a communication interface.

In a possible implementation:

The processing module 2202 is configured to determine that transmission of a first physical protocol data unit PPDU on a first link fails.

The transceiver module 2201 is configured to transmit a second PPDU to a receiver MLD at a first moment by using the first link, the second PPDU being used to retransmit an error part in the first PPDU. The first moment is a moment at which the transmitter MLD obtains transmission status information of a second link, and the transmission status information of the second link is used to indicate that transmission of a third PPDU on the second link fails. Alternatively, the first moment is a moment for transmitting a next PPDU on the first link if the first PPDU is normally transmitted.

In another possible implementation:

The processing module 2202 is configured to determine that transmission of a first physical protocol data unit PPDU on a first link fails.

The transceiver module 2201 is configured to transmit a second PPDU to a receiver MLD at a first moment by using the first link, the second PPDU being used to retransmit an error part in the first PPDU. The first moment is a predicted end moment of a first acknowledgement block BA, and the first BA is a BA of the first PPDU.

In still another possible implementation:

The processing module 2202 is configured to determine that transmission of a first physical protocol data unit PPDU or a first acknowledgement block BA on a first link fails, where the first BA is a BA of the first PPDU.

The processing module 2202 is further configured to start to perform channel backoff at a first moment, where the first moment is an end moment of the first BA.

The transceiver module 2201 is configured to transmit, after the channel backoff ends, a second PPDU to a receiver MLD by using the first link, the second PPDU being used to retransmit an error part in the first PPDU.

In yet another possible implementation:

The processing module 2202 is configured to receive a first block acknowledgement BA on a first link by using the transceiver module 2201, where the first BA is a BA of a first physical protocol data unit PPDU.

The processing module 2202 is further configured to transmit a second PPDU to a receiver MLD on the first link by using the transceiver module 2201, where an interval between a start moment of the second PPDU and an end moment of the first BA is interframe space, and the interframe space is point coordination function interframe space PIFS.

All related content of the steps in the foregoing method embodiments may be cited in function descriptions of corresponding functional modules. Details are not described herein again.

In this embodiment, the transmitter MLD 220 is presented in a form of division into functional modules in an integrated manner. The "module" herein may be a specified ASIC, a circuit, a processor and a memory that execute one or more software or firmware programs, an integrated logic circuit, and/or another component that can provide the foregoing functions.

Because the transmitter MLD 220 provided in this embodiment may perform the foregoing communication methods, for technical effects that can be obtained by the transmitter MLD 220, refer to the foregoing method embodiments. Details are not described herein again.

Figure 23:
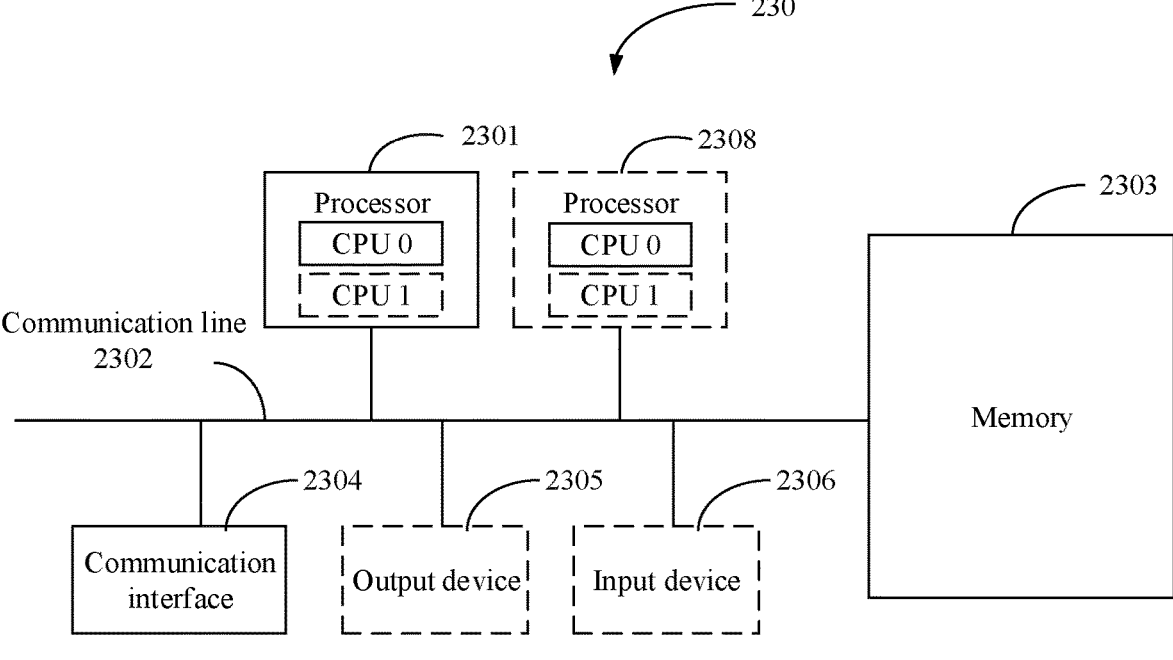
FIG. 23 is a schematic diagram of a structure of a communication device according to an embodiment of this application.

FIG. 23 is a schematic diagram of a hardware structure of a communication device 230 according to an embodiment of this application. The communication device 230 includes at least one processor 2301, a communication line 2302, a memory 2303, and at least one communication interface 2304.

The functions of the foregoing transmitter MLD may be implemented by using the communication device 230. For example, the processor 2301 in FIG. 23 may invoke computer-executable instructions stored in the memory 2303, so that the communication device 230 performs the methods in the foregoing method embodiments.

Specifically, the steps/the implementation process in FIG. 6, FIG. 11, FIG. 16, or FIG. 19 may be implemented by the processor 2301 in FIG. 23 by invoking the computer-executable instructions stored in the memory 2303. Alternatively, the processing-related functions/the implementation process in FIG. 6, FIG. 11, FIG. 16, or FIG. 19 may be implemented by the processor 2301 in FIG. 23 by invoking the computer-executable instructions stored in the memory 2303. The transmitting and receiving-related functions/the implementation process in FIG. 6, FIG. 11, FIG. 16, or FIG. 19 may be implemented by using the communication interface 2304 in FIG. 23.

The processor 2301 may be a general-purpose central processing unit (CPU), a microprocessor, an application-specific integrated circuit (ASIC), or one or more integrated circuits configured to control execution of a program in the solutions of this application.

The communication line 2302 may include a path on which information is transferred between the foregoing components.

The communication interface 2304 is any apparatus such as a transceiver, and is configured to communicate with another device or a communication network such as the Ethernet, a radio access network (RAN), or a wireless local area network (WLAN).

The memory 2303 may be a read-only memory (ROM) or another type of static storage device that can store static information and instructions, a random access memory (RAM) or another type of dynamic storage device that can store information and instructions, an electrically erasable programmable read only memory (EEPROM), a compact disc read-only memory (CD-ROM) or another optical disc storage, an optical disk storage (including a compact optical disc, a laser disc, an optical disc, digital a versatile optical disc, a Blu-ray disc, and the like), a magnetic disk storage medium or another magnetic storage device, or any other medium capable of carrying or storing desired program code in a form of an instruction or a data structure and capable of being accessed by a computer, but not limited thereto. The memory may exist independently, and is connected to the processor through the communication line 2302. The memory may alternatively be integrated with the processor.

The memory 2303 is configured to store computer-executable instructions for executing the solutions of this application, and execution is controlled by the processor 2301. The processor 2301 is configured to execute the computer-executable instruction stored in the memory 2303, to implement the link error recovery methods provided in the following embodiments of this application.

Optionally, the computer-executable instructions in this embodiment of this application may also be referred to as application program code. This is not specifically limited in this embodiment of this application.

During specific implementation, in an embodiment, the processor 2301 may include one or more CPUs, for example, a CPU 0 and a CPU 1 in FIG. 23.

In specific implementation, in an embodiment, the communication device 230 may include a plurality of processors, such as the processor 2301 and a processor 2308 in FIG. 23. Each of the processors may be a single-core (single-CPU) processor or a multi-core (multi-CPU) processor. The processor herein may be one or more devices, circuits, and/or processing cores configured to process data (for example, computer program instructions).

In specific implementation, in an embodiment, the communication device 230 may further include an output device 2305 and an input device 2306. The output device 2305 communicates with the processor 2301, and may display information in a plurality of manners. For example, the output device 2305 may be a liquid crystal display (LCD), a light emitting diode (LED) display device, a cathode ray tube (CRT) display device, a projector, or the like. The input device 2306 communicates with the processor 2301, and may receive user input in a plurality of manners. For example, the input device 2306 may be a mouse, a keyboard, a touchscreen device, or a sensing device.

The foregoing communication device 230 may be a general-purpose device or a dedicated device. In specific implementation, the communication device 230 may be a desktop computer, a portable computer, a network server, a personal digital assistant (PDA), a mobile phone, a tablet computer, a wireless terminal device, an embedded device, or a device having a structure similar to that in FIG. 23. A type of the communication device 230 is not limited in this embodiment of this application.

Optionally, an embodiment of this application further provides a communication apparatus (for example, the communication apparatus may be a chip or a chip system), where the communication apparatus includes a processor, configured to implement the method in any one of the foregoing method embodiments. In a possible design, the communication apparatus further includes a memory. The memory is configured to store necessary program instructions and data. The processor may invoke program code stored in the memory, to indicate the communication apparatus to implement the method in any one of the foregoing method embodiments. Certainly, the memory may not be located in the communication apparatus. When the communication apparatus is a chip system, the chip system may include a chip, or include a chip and other discrete devices. This is not specifically limited in this embodiment of this application.

All or some of the foregoing embodiments may be implemented through software, hardware, firmware, or any combination thereof. When a software program is used to implement the embodiments, all or some of the embodiments may be implemented in a form of a computer program product. The computer program product includes one or more computer instructions. When the computer program instructions are loaded and executed on a computer, all or some of the procedures or functions in the embodiments of this application are generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a web site, computer, server, or data center to another web site, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by the computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. In the embodiments of this application, the computer may include the foregoing apparatus.

Although this application is described with reference to the embodiments, in a process of implementing this application that claims protection, a person skilled in the art may understand and implement another variation of the disclosed embodiments by viewing the accompanying drawings, disclosed content, and the appended claims. In the claims, the term "comprising" does not exclude another component or another step, and "a" or "one" does not exclude a meaning of plurality. A single processor or another unit may implement several functions enumerated in the claims. Some measures are recorded in dependent claims that are different from each other, but this does not mean that these measures cannot be combined to produce a great effect.

Although this application is described with reference to specific features and the embodiments thereof, it is clear that various modifications and combinations may be made to them without departing from the scope of this application. Correspondingly, the specification and the accompanying drawings are merely example descriptions of this application defined by the appended claims, and are considered as any of or all modifications, variations, combinations, or equivalents that cover the scope of this application. It is clear that a person skilled in the art can make various modifications and variations to this application without departing from the scope of this application. This application is intended to cover these modifications and variations of this application provided that these modifications and variations fall within the scope of the claims of this application and equivalent technologies thereof.

What is claimed is:
1. A link error recovery method, wherein the method is applied to a transmitter multi-link device (MLD), links between the transmitter MLD and a receiver MLD comprise a first link and a second link, and the method comprises:
transmitting, by a transmitter MLD to a receiver MLD a first physical protocol data unit (PPDU) over a first link, wherein:
the transmitter MLD and receiver MLD have the first link and a second link therebetween; and
one of the transmitter MLD and receiver MLD has a simultaneous transmitting and receiving (STR) capability while the other does not have the STR capability;
determining, by the transmitter MLD, that transmission of the PPDU on the first link fails wherein the failure is because only one of the transmitter and receiver has STR capability; and
transmitting, by the transmitter MLD, a second PPDU to the receiver MLD at a first moment through the first link, wherein the second PPDU comprises a retransmitted error part from the first PPDU, wherein
the first moment is a moment at which the transmitter MLD obtains transmission status information of the second link, and the transmission status information of the second link indicates that transmission of a third PPDU on the second link fails; or the first moment is a moment for transmitting a next PPDU on the first link assuming that the first PPDU is normally transmitted.
2. The method according to claim 1, wherein the first moment is the moment at which the transmitter MLD obtains transmission status information of the second link, and an interval between the moment at which the transmitter MLD obtains the transmission status information of the second link and a predicted start moment of a first block acknowledgement (BA) is less than or equal to a first duration, wherein
the first BA is a BA of the first PPDU, and the first duration is a sum of a length of the first BA and a short interframe space (SIFS).
3. The method according to claim 1, wherein the first moment is the moment at which the transmitter MLD obtains transmission status information of the second link, and obtaining, by the transmitter MLD, the transmission status information of the second link comprises:
receiving, by a first station, the transmission status information of the second link from a second station, wherein the first station is a station that is in the transmitter MLD and supports the first link, and the second station is a station that is in the transmitter MLD and supports the second link.
4. The method according to claim 1, wherein an end moment of the second PPDU is the same as that of a fourth PPDU on the second link, and the fourth PPDU comprises a retransmitted error part from the third PPDU.
5. The method according to claim 1, wherein the transmitter MLD is an access point (AP) MLD, and the receiver MLD is a non-STR station MLD.
6. A transmitter multi-link device (MLD), comprising: at least one memory, configured to store computer instructions; and at least one processor, configured to perform the computer instructions to cause the transmitter MLD to:

determine that transmission of a first physical protocol data unit (PPDU) on a first link fails; and transmit a second PPDU to a receiver MLD at a first moment through the first link, wherein the second PPDU comprises a retransmitted error part from the first PPDU;

wherein the first moment is a moment at which the transmitter MLD obtains transmission status information of a second link, and the transmission status information of the second link indicates that transmission of a third PPDU on the second link fails; or the first moment is a moment for transmitting a next PPDU on the first link assuming that the first PPDU is normally transmitted;

wherein the first link and the second link are links between the transmitter MLD and the receiver MLD, one of the transmitter MLD and the receiver MLD has a simultaneous transmitting and receiving (STR) capability while the other does not have the STR capability.

7. The transmitter MLD according to claim 6, wherein the first moment is the moment at which the transmitter MLD obtains transmission status information of the second link, and an interval between the moment at which the transmitter MLD obtains the transmission status information of the second link and a predicted start moment of a first block acknowledgement (BA) is less than or equal to a first duration, wherein the first BA is a BA of the first PPDU, and the first duration is a sum of a length of the first BA and a short interframe space (SIFS).

8. The transmitter MLD according to claim 6, wherein an end moment of the second PPDU is the same as that of a fourth PPDU on the second link, and the fourth PPDU comprises a retransmitted error part from the third PPDU.

9. The transmitter MLD according to claim 6, wherein the transmitter MLD is an access point (AP) MLD, and the receiver MLD is a non-STR station MLD.

10. A non-transitory computer readable storage medium storing computer instructions, which when executed by at least one processor, cause a transmitter multi-link device (MLD) comprising the at least one processor to:

transmit, by a transmitter MLD to a receiver MLD a first physical protocol data unit (PPDU) over a first link, wherein:

the transmitter MLD and receiver MLD have the first link and a second link therebetween; and one of the transmitter MLD and receiver MLD has a simultaneous transmitting and receiving (STR) capability while the other does not have the STR capability;

determine that transmission of the PPDU on the first link fails, wherein the failure is because only one of the transmitter and receiver has STR capability; and transmit a second PPDU to a receiver MLD at a first moment through the first link, wherein the second PPDU comprises a retransmitted error part from the first PPDU;

wherein the first moment is a moment at which the transmitter MLD obtains transmission status information of a second link, and the transmission status information of the second link indicates that transmission of a third PPDU on the second link fails; or the first moment is a moment for transmitting a next PPDU on the first link assuming that the first PPDU is normally transmitted;

wherein the first link and the second link are links between the transmitter MLD and the receiver MLD.

11. The non-transitory computer readable storage medium according to claim 10, wherein the first moment is the moment at which the transmitter MLD obtains transmission status information of the second link, and an interval between the moment at which the transmitter MLD obtains the transmission status information of the second link and a predicted start moment of a first block acknowledgement (BA) is less than or equal to a first duration, wherein the first BA is a BA of the first PPDU, and the first duration is a sum of a length of the first BA and a short interframe space (SIFS).

12. The non-transitory computer readable storage medium according to claim 10, wherein an end moment of the second PPDU is the same as that of a fourth PPDU on the second link, and the fourth PPDU comprises a retransmitted error part from the third PPDU.

13. The non-transitory computer readable storage medium according to claim 10, wherein the transmitter MLD is an access point (AP) MLD, and the receiver MLD is a non-STR station MLD.

* * * * *